(12) United States Patent
Connelly et al.

(10) Patent No.: US 7,857,968 B2
(45) Date of Patent: Dec. 28, 2010

(54) HIGH PERFORMANCE SEWER SYSTEM

(75) Inventors: Richard W. Connelly, Carp (CA); Duane Smith, Ottawa (CA)

(73) Assignee: Clearford Industries Inc., Ottawa, Ontario (CA)

( * ) Notice: Subject to any disclaimer, the term of this patent is extended or adjusted under 35 U.S.C. 154(b) by 66 days.

(21) Appl. No.: 12/088,362

(22) PCT Filed: Sep. 27, 2006

(86) PCT No.: PCT/CA2006/001575

§ 371 (c)(1),
(2), (4) Date: Oct. 3, 2008

(87) PCT Pub. No.: WO2007/036027

PCT Pub. Date: Apr. 5, 2007

(65) Prior Publication Data
US 2009/0032450 A1 Feb. 5, 2009

Related U.S. Application Data

(60) Provisional application No. 60/728,257, filed on Oct. 19, 2005, provisional application No. 60/809,637, filed on May 30, 2006, provisional application No. 60/807,315, filed on Jul. 13, 2006, provisional application No. 60/827,160, filed on Sep. 27, 2006.

(30) Foreign Application Priority Data
Sep. 27, 2005 (CA) .................................. 2521428

(51) Int. Cl.
*B01D 21/02* (2006.01)

(52) U.S. Cl. .................. 210/170.08; 210/192; 210/519; 210/532.2; 210/920; 285/133.11; 285/134.1; 73/40; 137/140

(58) Field of Classification Search ............ 210/170.08, 210/187, 192, 243, 299, 519, 521, 532.2, 210/539, 919, 920; 285/133.11, 133.21, 285/134.1; 73/40, 40.5 R; 134/140
See application file for complete search history.

(56) References Cited

U.S. PATENT DOCUMENTS

| | | | | |
|---|---|---|---|---|
| 1,950,841 A | * | 3/1934 | Crawford | 210/170.08 |
| 2,944,669 A | * | 7/1960 | Schaaf | 210/170.08 |
| 3,275,157 A | * | 9/1966 | Stamps | 210/521 |
| 3,630,370 A | * | 12/1971 | Quina | 210/170.08 |
| 3,706,662 A | * | 12/1972 | Wellford, Jr. | 210/748.17 |

(Continued)

OTHER PUBLICATIONS

Upton, C., Office Action for U.S. Appl. No. 08/778,627, filed Jan. 3, 1997, U.S. Patent and Trademark Office, Alexandria, Virginia, mailed Oct. 27, 1997.

(Continued)

*Primary Examiner*—Christopher Upton
(74) *Attorney, Agent, or Firm*—Sterne, Kessler, Goldstein & Fox P.L.L.C.

(57) ABSTRACT

The system comprises one or more of the following: primary treatment units, flexible pipes, and optionally, one or more pumps. The system is designed and installed in a manner that enables the flow of liquid to be predominantly due to gravity, although one or more pumps may optionally be included at key positions. The system can be sealed and pressure tested in order for optimal performance to be achieved during operation.

17 Claims, 29 Drawing Sheets

U.S. PATENT DOCUMENTS

| | | | | |
|---|---|---|---|---|
| 3,730,884 | A * | 5/1973 | Burns | 210/170.08 |
| 3,826,376 | A * | 7/1974 | Carlson et al. | 210/519 |
| 3,875,051 | A * | 4/1975 | Kovarik | 210/170.08 |
| 3,914,164 | A * | 10/1975 | Clark | 210/605 |
| 4,124,481 | A * | 11/1978 | Ramer | 210/192 |
| 4,363,732 | A * | 12/1982 | Crates et al. | 210/532.2 |
| 5,441,632 | A * | 8/1995 | Charon | 210/170.08 |
| 5,580,453 | A * | 12/1996 | Nurse, Jr. | 210/457 |
| 5,895,569 | A * | 4/1999 | Connelly | 210/170.08 |
| 6,053,206 | A * | 4/2000 | Johannesen | 137/810 |
| 6,089,254 | A * | 7/2000 | Kortmann | 73/40 |
| 6,200,470 | B1 * | 3/2001 | Romero et al. | 210/170.08 |
| 6,224,772 | B1 | 5/2001 | Gólcz | |
| 6,267,001 | B1 * | 7/2001 | Duncan | 73/40.5 R |
| 6,280,614 | B1 * | 8/2001 | Berg et al. | 210/170.08 |
| 6,541,139 | B1 * | 4/2003 | Cibuzar | 210/532.2 |
| 6,562,236 | B2 * | 5/2003 | Rylander et al. | 210/532.2 |
| 7,001,514 | B1 * | 2/2006 | Liao | 210/532.2 |
| 7,282,143 | B2 | 10/2007 | Liao | |
| 2002/0195155 | A1 * | 12/2002 | Debaisieux et al. | 285/133.11 |
| 2004/0222149 | A1 * | 11/2004 | Abrams | 210/519 |
| 2006/0196827 | A1 * | 9/2006 | Liao | 210/521 |

OTHER PUBLICATIONS

Upton, C., Office Action for U.S. Appl. No. 08/778,627, filed Jan. 3, 1997, U.S. Patent and Trademark Office, Alexandria, Virginia, mailed Jul. 22, 1998.

* cited by examiner

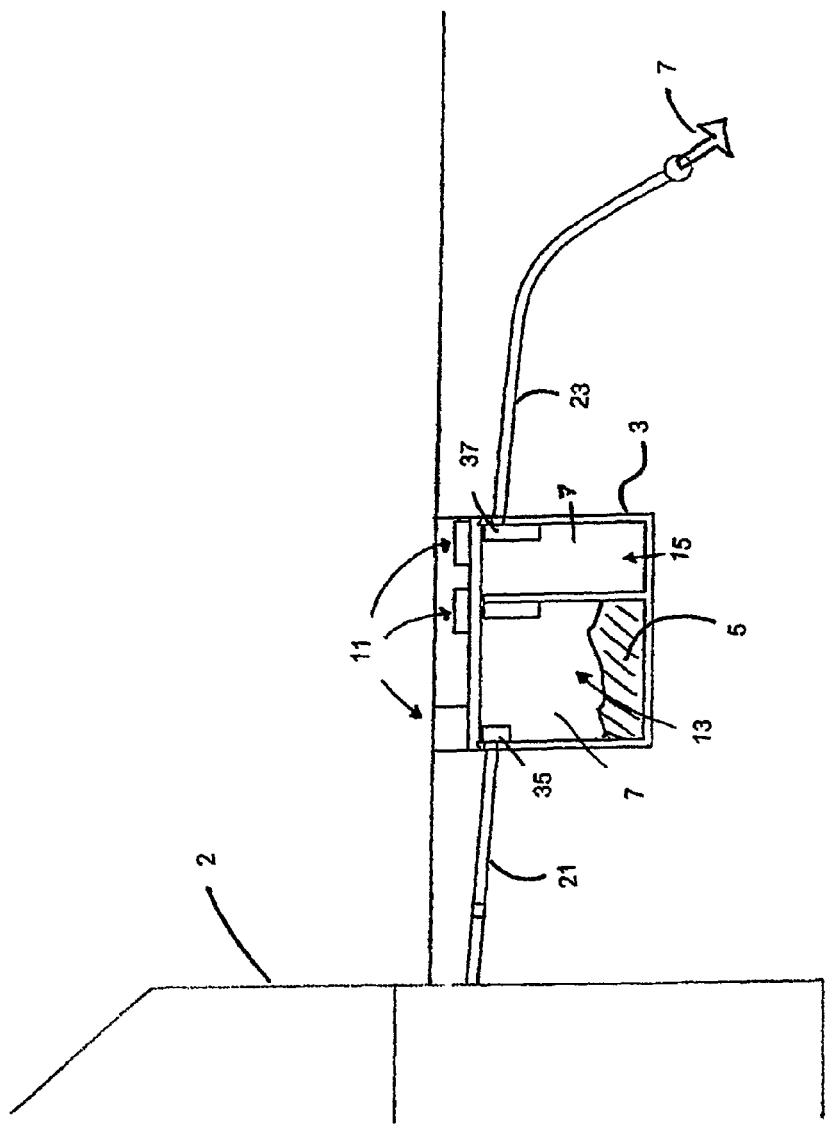

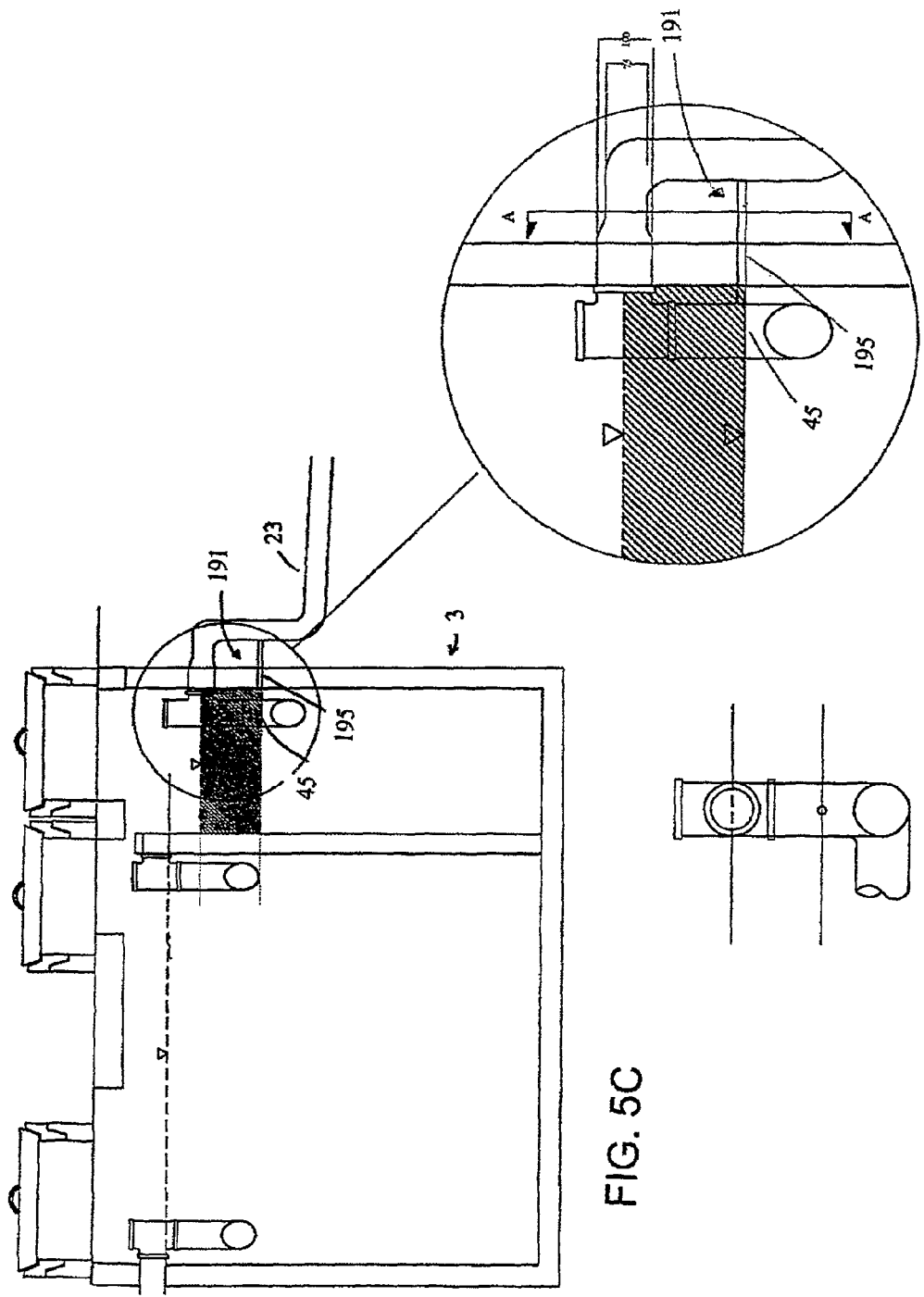

HIGH PERFORMANCE SEWER SYSTEM

FIELD OF THE INVENTION

The present invention relates in general to the field of sewer systems for residential developments. In particular, the invention relates to sewer systems that minimize infiltration of ground water or exfiltration of sewage.

BACKGROUND OF THE INVENTION

The cost of installing a historic sewer system in a new parcel of land is one of the largest roadblocks to economic and infrastructure development for any community. Similarly, small or remote communities cannot afford the high price of adding a historic sewer system even for residential usage and citizens continue to use private wells and inefficient septic systems.

Historic sewer system installations cause significant disruption to a community and require major reconstruction of roadways. Individual dwellings are connected to a historic sewer system through the use of large diameter rigid piping consisting of a series of interconnecting pipe. The connections of such pipes are not sealed, allowing infiltration of ground water which can account for 50% to 70% of a historic sewage system's capacity. These unsealed locations along the collection mains and laterals can also result in exfiltration of sewage effluent which can be as high as 30% to 40% of the sewage effluent passing through the system.

Historic sewer systems typically use jointed PVC tubing which averages 200 mm to 600 mm in diameter. Rubber gaskets, prone to degradation and leaking are typically used at the connections. Over time, the pipes of such systems flex unduly and/or are subject to tree root intrusion and as a result, pipes can separate, resulting in infiltration of ground water into the sewer system.

Moreover, historic pipes must be deeply buried below frost penetration elevation. Therefore, historic sewer pipes require the digging of large, straight trenches approximately a minimum of 6 to 8 feet deep, sloping steeply at 0.5%. As well, the preferred and normal location of historic systems is below the roadway centerline. Historic sewers therefore are timely to install and the choice of overall layout is dictated by access for maintenance.

In addition, historic systems are sensitive to gradient changes. Pipe gradients are steeper than the road gradients to allow for the required higher scouring velocities required to cleanse wastewater solids. Historic pipes are kept in a straight alignment between manholes to aid maintenance and cleaning of the system.

The inclusion of ground water and high peaking factors in the design of pipes, pump stations, and treatment plants can result in an overall historic sewer system which is complex and oversized. Historic sewer systems collect solid waste sludge at the treatment plants which must be removed regularly. Due to limited storage capacity at plants, sludge is kept for a short time in the system, and there is little degradation of sludge; therefore, high sludge volumes result from the lack of sufficient sludge digestion time.

Lift pumps must be correspondingly large and complex in order to handle solids and high peak flows.

Other more efficient sewer systems, such as U.S. Pat. No. 5,895,569 to Connelly, have overcome the problems of historic sewer systems. Connelly discloses watertight pipes downstream of the primary treatment unit. Connelly, however, does not disclose a zero water infiltration or sewage exfiltration system. Furthermore, Connelly does not disclose means to optimize the amount of total suspended solids (TSS) which is retained in the first compartment of the primary treatment unit.

Therefore, there is a need to provide a new efficient sewer collection system for residential buildings which is inexpensive to install and maintain and which overcomes the problems identified in the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a high performance sewer system. In accordance with one aspect of the present invention there is provided a sewer system for carrying sewage effluent from a source of sewage for treatment at a sewage treatment center, the sewer system comprising: an inlet pipe for carrying the solid and liquid sewage from the source of sewage; a primary treatment unit for receiving said solid and liquid sewage from the source of sewage via the inlet pipe, wherein said inlet pipe is sealingly connected to the primary treatment unit via a connection so as to be substantially airtight, said primary treatment unit comprising a first compartment for receiving said solid and liquid sewage and retaining sewage solids, and a second compartment in fluid communication with said first compartment by means of a conduit for receiving substantially liquid sewage from said first compartment, wherein liquid and solid components of the sewage are substantially separated and substantially all of the sewage solids are retained in said first compartment; a lateral sewer pipe sealingly connected to said second compartment of said primary treatment unit via a connection so as to be substantially airtight for receiving the substantially liquid sewage from said second compartment of said primary treatment unit, a collection main sealingly connected to said lateral sewer pipe so as to be substantially airtight for conduct whereby said substantially liquid effluent is carried to said treatment center; and one or more vents sealingly connected to any of the primary treatment unit, lateral sewer pipe or collection main to permit the exchange of gasses between the sewer system and external environment during operation, wherein said system is substantially airtight when said vents are sealed.

In accordance with another aspect of the present invention there is provided a primary treatment unit, sealingly connected such that it is airtight to a source of sewage and a means for conducting sewage to a sewage treatment center, said primary treatment unit comprising: a first compartment for receiving solid and liquid sewage from said source of sewage and retaining sewage solids; a second compartment in fluid communication by means of a conduit with said first compartment for receiving substantially liquid sewage from said first compartment and delivery said substantially liquid sewage to said means for conducting sewage; said conduit comprising one or more tubes leading from said first compartment to said second compartment, for conducting liquid sewage from said first compartment to said second compartment; wherein said tubes are positioned at an angle relative to the central vertical axis of said primary treatment unit; and wherein said angled tubes prevent said solid sewage from passing into said second compartment.

In accordance with another aspect of the present invention there is provided a method of installing a sewer system for carrying sanitary sewage effluent from a source of sewage for treatment at a sewage treatment center, said method comprising the following steps: Providing a sewer system comprising: one or more primary treatment units sealingly connected to a source of sewage wherein said one or more primary treatment units receive solid and liquid sewage and retain substantially all of said solid sewage; flexible piping sealingly connected to said one or more primary treatment units and a sewage treatment plant; one or more vents to allow an exchange of gases between said sewer system and the outside environment; wherein, when said vents are sealed, said system is substantially airtight; determining the impact of the fluid dynamics factors for example, fluid load, changes in fluid volume, air flow, venting, the gradient of the pipe, the possibility of air lock on said system; determining the impact of the local topography and geology of the area including all of the local site conditions, such as geotechnical data, topography, location of existing services and infrastructure, areas of environmental sensitivity, and the like on said system; determining the impact of wastewater flows per capita and existing water consumptions rates on said system; determining the venting requirement of the system and the impact of the number, placement and separation distances between vents on the system determining the access point and maintenance serviceability requirements of the system; determining the impact of different materials and techniques on the system in light of the factors identified in the previous steps; installing said sewer system in light of the factors identified in the previous steps so as to take advantage of topographical features, minimize disruption to residents, and to optimize the flow capacities throughout said system.

In accordance with another aspect of the present invention there is provided a system for promoting microbial processing of solid waste, the system comprising a solid waste holding tank and a means for promoting microbial processing; wherein the means for promoting microbial processing optimizes environmental conditions for aerobic and/or anaerobic digestion of the solid.

In accordance with another aspect of the present invention there is provided a system for reducing sludge accumulation during remediation of wastewater; the system comprising: a tank having one or more inlets for receiving sewage and one or more outlets; wherein sewage within the tank forms a scum layer, a substantially liquid layer and a sludge layer; an electrolysis system comprising a power source and a electrode pair comprising an anode and cathode, wherein the electrode pair is located within the tank and the cathode is substantially submerged in the sludge layer; wherein in situ generation of hydrogen stimulates digestion of the sludge.

In accordance with another aspect of the present invention there is provided a fluid attenuation device for regulating flows of liquid exiting a clearance or septic tank, said fluid attenuation device comprising; an outlet assembly comprising; one or more substantially vertical pipes with an upper end and a lower end, one or more outlet pipes substantially perpendicular to and in fluid communication with said one or more substantially vertical pipes; and wherein each of said one or more substantially vertical pipes comprises an interior partition that divides said pipe into one or more sections along its vertical axis from said lower end at least until the point wherein said substantially vertical pipe connects with said outlet pipe; a plug with one or more orifices inserted into at least one of said one or more partitions at the lower end of said substantially vertical pipe; wherein, liquid passes through said orifice into said partition prior to entering said outlet pipe.

In accordance with another aspect of the present invention there is provided a fluid attenuation device for regulating flows of liquid exiting a clearance or septic tank, said fluid attenuation device comprising; an outlet assembly comprising; one or more substantially vertical pipes with an upper end and a lower end, one or more outlet pipes comprising a first portion that is substantially perpendicular to and in fluid communication with said one or more substantially vertical pipes and a second portion that is substantially parallel to said one or more substantially vertical pipes; wherein said second portion is lower than said first portion; a weeping tube sealingly connected at one end to said substantially vertical pipe and said second portion of said outlet pipe at the opposing end; wherein said substantially vertical pipe possesses a first width; wherein said outlet pipe possesses a second width; wherein said weeping tube possesses a third width; and wherein said third width is less than said first and second widths;

In accordance with another aspect of the present invention there is provided a fluid attenuation device for regulating flows of liquid exiting a clearance or septic tank, said fluid attenuation device comprising; an outlet assembly comprising; one or more substantially vertical pipes with an upper end and a lower end, a plug with one or more orifices inserted into the lower end of said substantially vertical pipe.

In accordance with another aspect of the present invention there is provided a method for pressure testing a substantially airtight sewer system, said method involving the following steps: Providing a sewer system comprising: one or more primary treatment units sealingly connected to a source of sewage wherein said one or more primary treatment units receive solid and liquid sewage and retain substantially all of said solid sewage; flexible piping sealingly connected to said one or more primary treatment units and a sewage treatment plant; one or more vents to allow an exchange of gases between said sewer system and the outside environment; wherein, when said vents are sealed, said system is substantially airtight.

BRIEF DESCRIPTION OF DRAWINGS

FIG. 1B is a perspective partial cross sectional view of a primary treatment unit attached to a residential building and a lateral sewer pipe according to one embodiment of the present invention.

FIG. 5C is a partial cut-away view of the outlet connection from FIG. 5, comprising a flow attenuation device with a weeping tube according to one embodiment of the present invention.

FIG. 5D is an enlarged view of the flow attenuation device with a weeping tube of FIG. 5C.

FIG. 5E is a view of the flow attenuation device with a weeping tube according to one embodiment of the present invention.

DETAILED DESCRIPTION OF THE INVENTION

The term "sewage" is used to define the liquid, solid, gaseous substance that enters the primary treatment unit.

The term "liquid effluent" is used to define the substantially liquid substance that exits the primary treatment unit.

The term "sludge" is used to define solid matter that settles and collects in the first chamber of the primary treatment unit.

The term "electrolysis" is used to define the lysis of a chemical bond produced by the passage of an electric current and includes electrolysis of water into hydrogen and oxygen.

The term "microbe" is used to define includes bacteria and other microorganisms

Unless defined otherwise, all technical and scientific terms used herein have the same meaning as commonly understood by one of ordinary skill in the art to which this invention belongs.

The system comprises one or more of the following: primary treatment units, flexible pipes, and optionally, one or more pumps. The system is designed and installed in a manner that enables the flow of liquid to be predominantly driven by to gravity, although one or more pumps may optionally be included at key positions. The system is sealed in a manner such that all connection are formed to be air tight. Thus upon closing of the vents, the entire system will be air tight, however during operation the vents are open in order to avoid hydraulic lock. This sealed configuration of all components and connections of the system can provide a means for pressure testing and ensures no exfiltration or infiltration during operation.

Figure 1A:
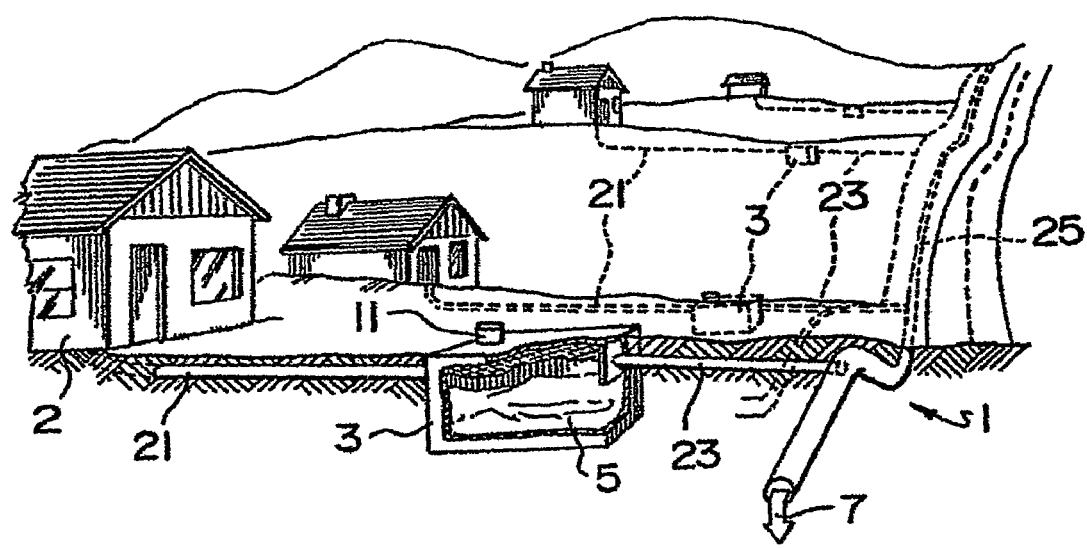
FIG. 1A is a perspective partial cross sectional view of one embodiment of the sewer system of the present invention.

Referring to FIG. 1A, there is depicted a high performance sewer system 1 according to one embodiment of the present invention. This system is designed to collect sewage from a source of sewage 2 such as a residence and carry the liquid effluent to a central treatment center (not shown) for processing. The sewer system according to the present invention is particularly well adapted to be installed in remote areas or areas with large amounts of rock near the ground surface which impedes the use of private sewage disposal systems.

Referring to FIGS. 1A and 1B, pipes 21 and 23 are sealingly connected to the primary treatment unit 3 so as to be substantially airtight. The inlet sewer pipe 21 bringing sewage from a source of sewage 2 enters the primary treatment unit 3, which comprises at least a first compartment 13 and a second compartment 15. Inlet sewer pipe 21 conducts both solid (sludge) 5 and liquid effluent 7 sewage in the first compartment 13 of the primary treatment unit 3. As the solid sewage 5 settles in the first compartment 13, the liquid effluent 7 flows from the first compartment 13 into the second compartment 15 via a conduit comprising one or more tubes (not shown). The lateral sewer pipe 23 conducts the liquid effluent 7, from the second compartment 15 to the collection main 25. The liquid effluent 7 flows through the collection main 25 to a sewage treatment center (not shown). If the gradient differs substantially, pumping stations (not shown) may be provided, spaced along the collection main 25.

All the components are sealed such that that the system can be pressure tested when the vents are sealed, and therefore the system is substantially air tight. As the system does not permit infiltration of ground water, the sewage treatment center receives only the net liquid effluent, which exits the system's primary treatment units. The primary treatment unit 3 is pressure tested and pre-plumbed prior to installation.

The primary treatment of the sewage occurs in the first compartment of the primary treatment unit, resulting in a large decrease of solids, including suspended solids, in the liquid effluent exiting the primary treatment unit. Residential communities generally generate daily peak flows in the morning and early evening. All elements of any sewer system are designed for peak flows. Minimizing the peaking factor eases the sizing strain on the sewer system and allows for smaller, less complicated sewer systems with lower capital costs to install and maintain.

In the present invention, since the majority of solids are processed in the individual primary treatment units, the peaking factor in the pipes is substantially minimized. In addition, the time period of peak flow rates can be substantially shifted from traditional high demand periods. For an existing sewer system that is connected to the system according to the present invention, this ability to 'peak shift' using the system according to the present invention, can provide additional capacity to an existing sewer system that is limited by high volumes during peak demand periods. Furthermore, the system according to the present invention can reduce the amount of solid waste that is treated in the centralized treatment center.

The high performance sewer system of the present invention allows for a low flow rate of liquid effluent due to the absence of solid sewage passing through the system. Historic sewer systems require a fast flow rate to prevent buildup of solid sewage in the pipes. The absence of solid sewage can also allow for easier cleaning of the system. This lower flow rate of the liquid effluent required by the system according to the present invention can allow for more gentle gradients in the collection main. Access points such as maintenance cleanouts and covers are provided along the system at spaced intervals, which are all sealingly connected to the system. Because of the substantial absence of solids in the liquid effluent and the ease of cleaning the system, these access points do not need to be placed as frequently as would occur with a historic sewer system. For the sewer system according to the present invention, flushing is typically required less often than in historic systems and may occur approximately every seven to ten years, always after unit desludging.

Figure 7:
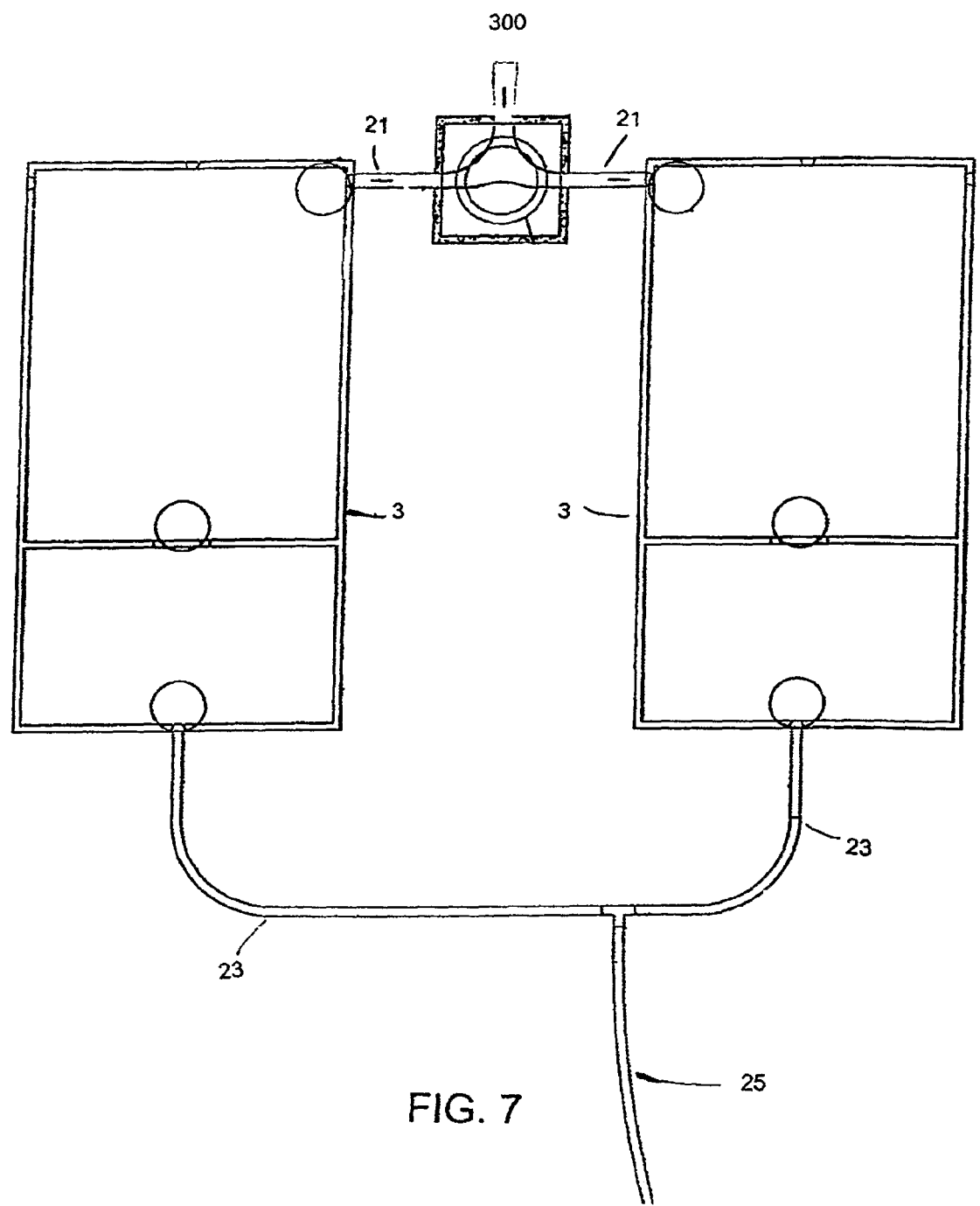
FIG. 7 is a plan perspective view of multiple primary treatment units connected to a single source of sewage according to one embodiment of the present invention.

In one embodiment of the present invention, an existing sewer system can be retrofitted to interface with a high performance gravity sewer system of the present invention. With reference to FIG. 7, the existing sewer system 300 is redirected to multiple primary treatment units 3. In order to be effective, the primary treatment units 3 would typically be larger than the primary treatment units installed at individual residences. Once settling of the solid waste has occurred in the first compartment, the liquid effluent is conducted through lateral sewer pipes 23 to a collection main 25. This embodiment allows communities to benefit from the advantages of the system of the present invention without the need to replace their entire sewer infrastructure.

The Primary Treatment Unit

As shown in FIG. 1B, the high performance sewer system of the present invention comprises a primary treatment unit 3, connected to and receiving sewage from a source of sewage 2, wherein the primary treatment unit 3 separates solid 5 from the liquid effluent 7. Embodiments of the primary treatment unit 3, are shown in detail in FIGS. 3A-G.

The primary treatment unit can be made of concrete, such as high strength, reinforced concrete of at least 35 mPa (4,500 psi), but may also be made of any suitable material such as fiberglass or high density polyethylene (HDPE) or other type of material as would be known to a worker skilled in the art which would enable the desired level of system sealing to be obtained.

In one embodiment of the present invention, the primary treatment unit 3 comprises two compartments: a first compartment 13 and a second compartment 15. The compartments 13 and 15 are separated by an interior wall 16. The upper edge of the interior wall 16 is slightly lower than the upper edge of the primary treatment unit 3. This separation creates a gap that permits gas exchange between compartments 13 and 15. The interior wall 16 comprises a conduit 20 that permits the first compartment 13 to be in fluid connection with the secondary compartment 15.

In one embodiment of the present invention, the ratio between the size of the first compartment and size of the second compartment can range up to 12:1. In one embodiment of the present invention, the ratio between the size of the first compartment and the size of the second compartment is at least 3:1. In one embodiment of the present invention, the ratio between the size of the first compartment and the size of the second compartment is at least 4:1. In one embodiment of the present invention, the ratio between the size of the first compartment and the size of the second compartment is at least 5:1. In one embodiment of the present invention, the ratio between the size of the first compartment and the size of the second compartment is at least 6:1. In one embodiment of the present invention, the ratio between the size of the first compartment and the size of the second compartment is at least 7:1. In one embodiment of the present invention, the ratio between the size of the first compartment and the size of the second compartment is at least 8:1. In one embodiment of the present invention, the ratio between the size of the first compartment and the size of the second compartment is at least 9:1.

In one embodiment of the present invention, the ratio between the size of the first compartment and the size of the second compartment can range between 3:1 and 12:1. In one embodiment of the present invention, the ratio between the size of the first compartment and the size of the second compartment can range between 3:1 and 11:1. In one embodiment of the present invention, the ratio between the size of the first compartment and the size of the second compartment can range between 3:1 and 10:1. In one embodiment of the present invention, the ratio between the size of the first compartment and the size of the second compartment can range between 3:1 and 9:1. In one embodiment of the present invention, the ratio between the size of the first compartment and the size of the second compartment can range between 3:1 and 8:1. In one embodiment of the present invention, the ratio between the size of the first compartment and the size of the second compartment can range between 3:1 and 7:1. In one embodiment of the present invention, the ratio between the size of the first compartment and the size of the second compartment can range between 3:1 and 6:1. In one embodiment of the present invention, the ratio between the size of the first compartment and the size of the second compartment can range between 3:1 and 5:1. In one embodiment of the present invention, the ratio between the size of the first compartment and the size of the second compartment can range between 3:1 and 4:1. In one embodiment of the present invention, the ratio between the size of the first compartment and the size of the second compartment can range between 10:1 and 12:1. In one embodiment of the present invention, the ratio between the size of the first compartment and the size of the second compartment can range between 9:1 and 12:1. In one embodiment of the present invention, the ratio between the size of the first compartment and the size of the second compartment can range between 8:1 and 9:1. In one embodiment of the present invention, the ratio between the size of the first compartment and the size of the second compartment can range between 7:1 and 9:1. In one embodiment of the present invention, the ratio between the size of the first compartment and the size of the second compartment can range between 6:1 and 9:1. In one embodiment of the present invention, the ratio between the size of the first compartment and the size of the second compartment can range between 5:1 and 9:1. In one embodiment of the present invention, the ratio between the size of the first compartment and the size of the second compartment can range between 4:1 and 9:1. In one embodiment of the present invention, the ratio between the size of the first compartment and the size of the second compartment can range between 3:1 and 9:1. In one embodiment of the present invention, the ratio between the size of the first compartment and the size of the second compartment is at least 3:1. In one embodiment of the present invention, the ratio between the size of the first compartment and the size of the second compartment is at least 3:1.

The primary treatment unit 3 is connected to a building's sewage system through an inlet sewer pipe 21 which receives sewage from the source of sewage 2 and empties it into the first compartment 13 of the primary treatment unit 3. Each source of sewage 2 may have one or several primary treatment units 3 or several sources of sewage 2 may be connected to one primary treatment unit 3, depending upon the sewer demand and land availability. When the one or more access hatches 11 are secured to the primary treatment unit 3 and the inlet pipe 35 and outlet pipe 37 are plugged, the primary treatment unit is substantially airtight. A skilled worker will appreciate that a primary treatment unit's dimensions will be designed to accommodate the application, namely its connection to one or more buildings, for example. Typical primary treatment units for residential use can average between 3,600-4,500 liters in capacity, for example.

Primary treatment of the sewage occurs within the compartments 13 and 15 of the primary treatment unit 3. In the first compartment 13, solid sewage 5 settles. Liquid effluent 7 flows from the first compartment 13, through the conduit 20, into the separate second compartment 15 before flowing out of the primary treatment unit 3. The second compartment 15 allows any remaining solid sewage 5 particles suspended in the liquid effluent 7 to settle out before the liquid effluent 7 passes out through the outlet pipe 37. It will be understood, moreover, that the primary treatment unit 3 may include additional settling compartments to receive the outflow from second compartment 15. Provision of additional compartments will permit additional sludge solids to settle from the liquid effluent before discharge thereof into the collection main. By separating the solid sewage 5 at substantially each dwelling, the liquid effluent in the collection main is effectively pretreated before it enters a centralized treatment plant. Therefore, this sewer system 1 can result in a reduction in size and complexity of the necessary municipal sewage treatment plants. In addition, if any solid sewage precipitates from the liquid effluent in the second compartment 15 or additional compartment, it may also degrade or be removed in a similar manner to that of the first compartment 13.

Access Hatches

Figure 3A:
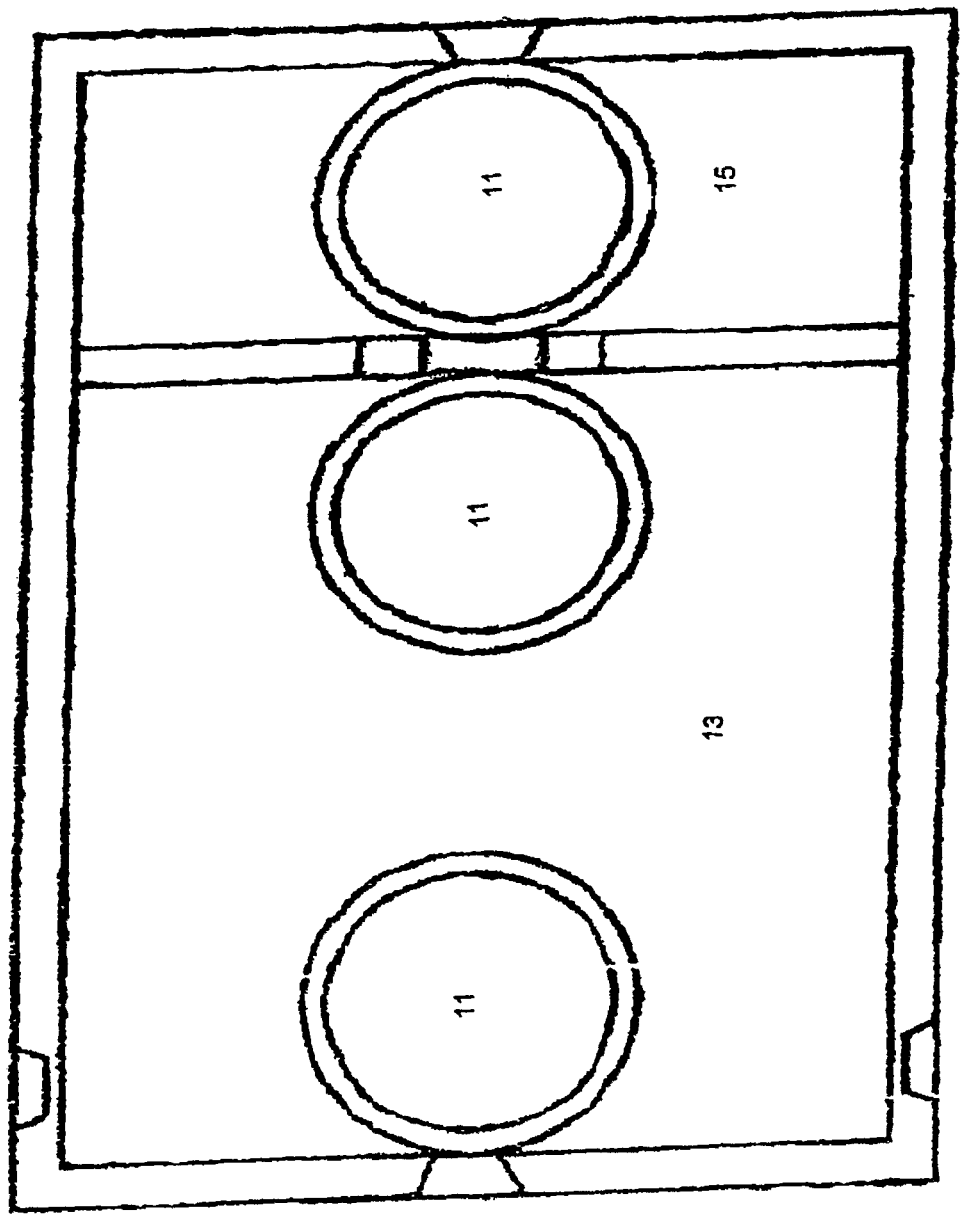
FIG. 3A is a plan cross sectional view of a primary treatment unit according to one embodiment of the present invention.
Figure 3B:
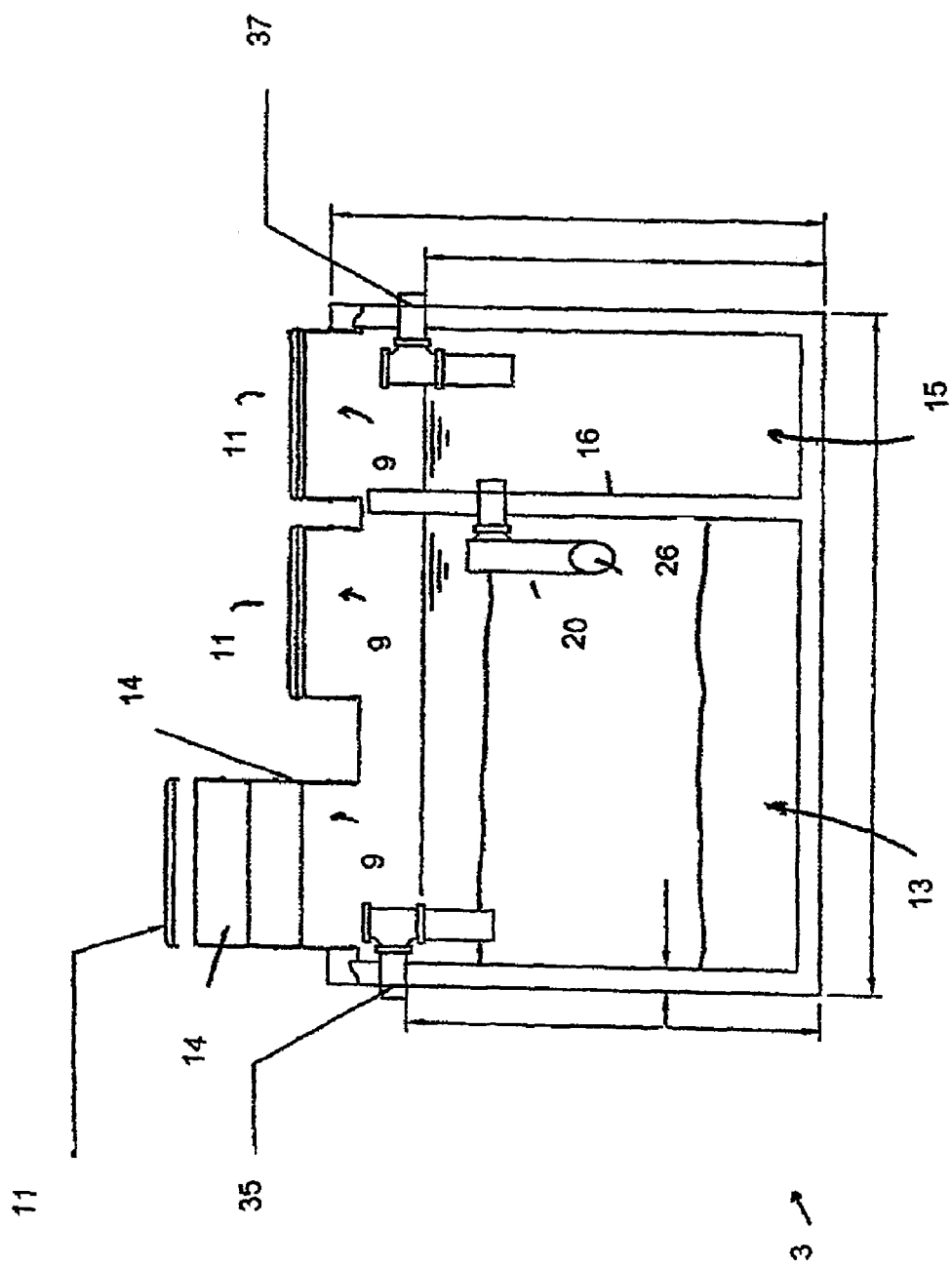
FIG. 3B is a side cross sectional view of a primary treatment unit according to one embodiment of the present invention.

With reference to FIGS. 3A and 3B, in one embodiment of the present invention, the primary treatment unit 3 comprises one or more openings 9 and lids 11 in its top to enable easy access to the compartments 13, 15 of the primary treatment unit 3 for maintenance and repairs as well as removal of solid sewage (sludge) 5. At least one lid 11 is positioned such that it can be removed to gain access to the first compartment 13 of the primary treatment unit 3. One potential difficulty in removing solid sewage 5 from the compartments 13, 15 is that the scum layer, an oily top layer that forms within the primary treatment unit, can harden to form a solid crust which must first be removed in order for the solid sewage 5 to be removed. In one embodiment, the openings 9 are of sufficient diameter to allow for this crust to be broken up and removed in order that the solid sewage 5 can then be efficiently removed In one embodiment, at least one lid 11 is installed such that it is flush with the ground level when the primary treatment unit 3 is installed to provide easy access for routine maintenance and solid sewage removal without disruption to the surrounding land. With reference to FIG. 3B, in one embodiment of the present invention, rings 14 can be connected to an opening 9 in the primary treatment unit 3 to bring the lid 11 flush with the ground. Rings 14 can be made of PVC or any other type of material as would be known to a worker skilled in the art which would enable rings 14 to be easily and sealably connected to the primary treatment unit 3 at the time of installation. In one embodiment of the present invention, the access hatch also possesses a grate (not shown), which is removably attached to the primary treatment unit 3 below the lid 11 to prevent unauthorized or accidental entry into the primary treatment unit 3 after installation. In one embodiment of the present invention, the lid 11 is sealed with bolts that require a proprietary tool to tighten and loosen.

Conduit

With reference to FIGS. 3B-E, in one embodiment of the present invention, a conduit 20, is located in the first compartment 13 adjacent the interior wall 16 and is positioned such that the opening 26 is below the scum layer and above the sludge layer. One or more hollow tubes 28 extend from the conduit vertically downwards towards the bottom of the primary treatment unit.

Figure 3C:
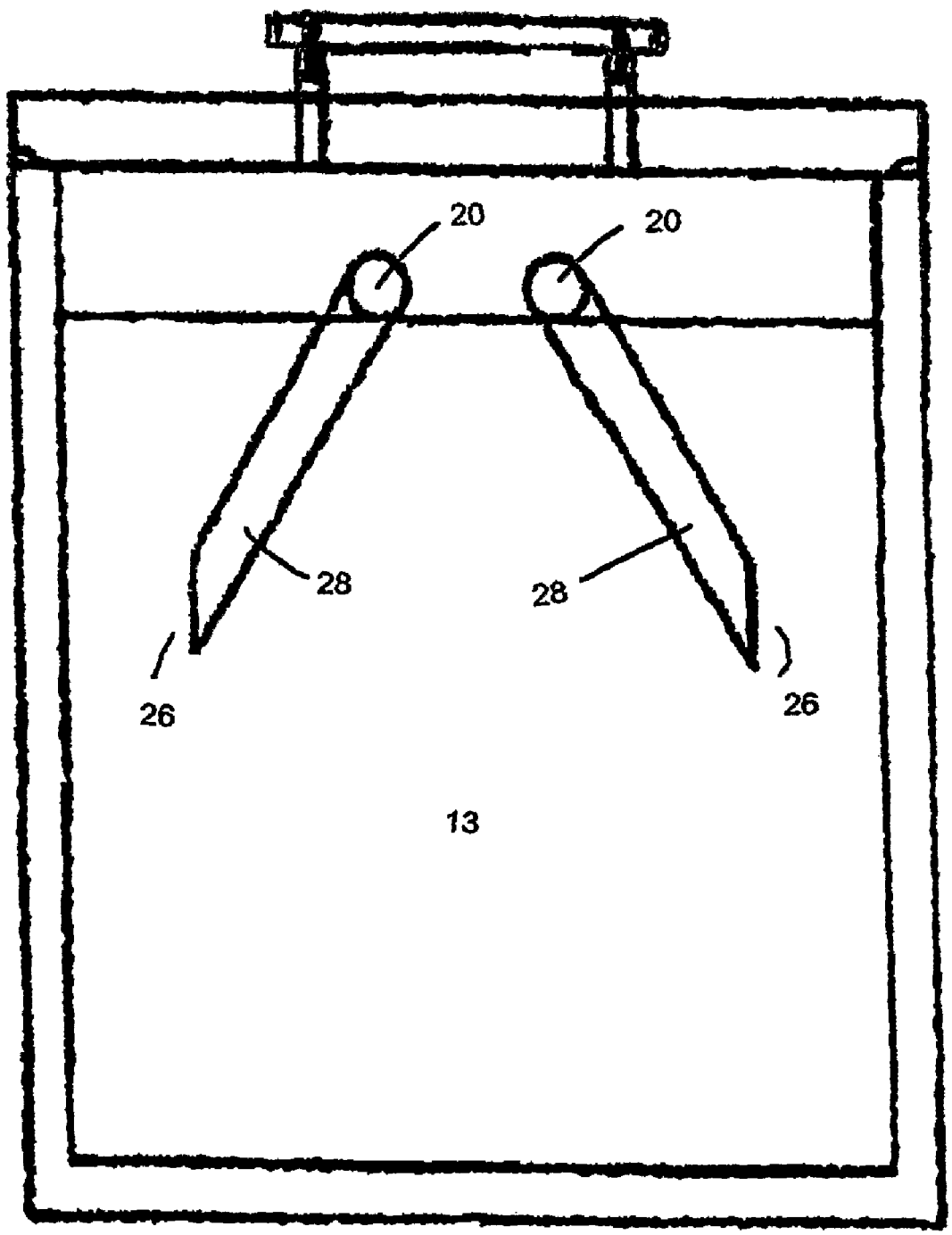
FIGS. 3C-E are end cross sectional views of the first compartment according to embodiments of the present invention.
Figure 3D:
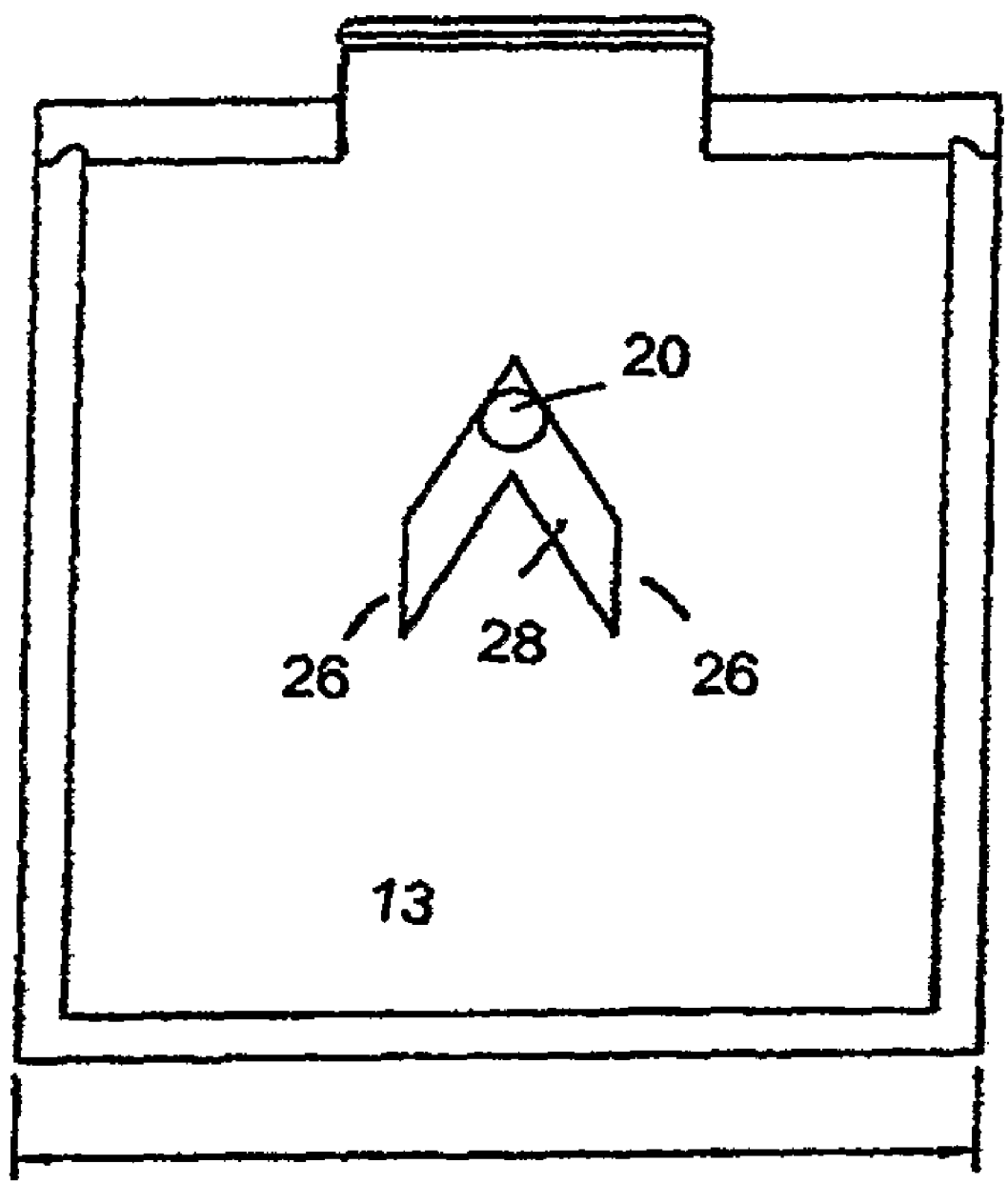
Figure 3E:
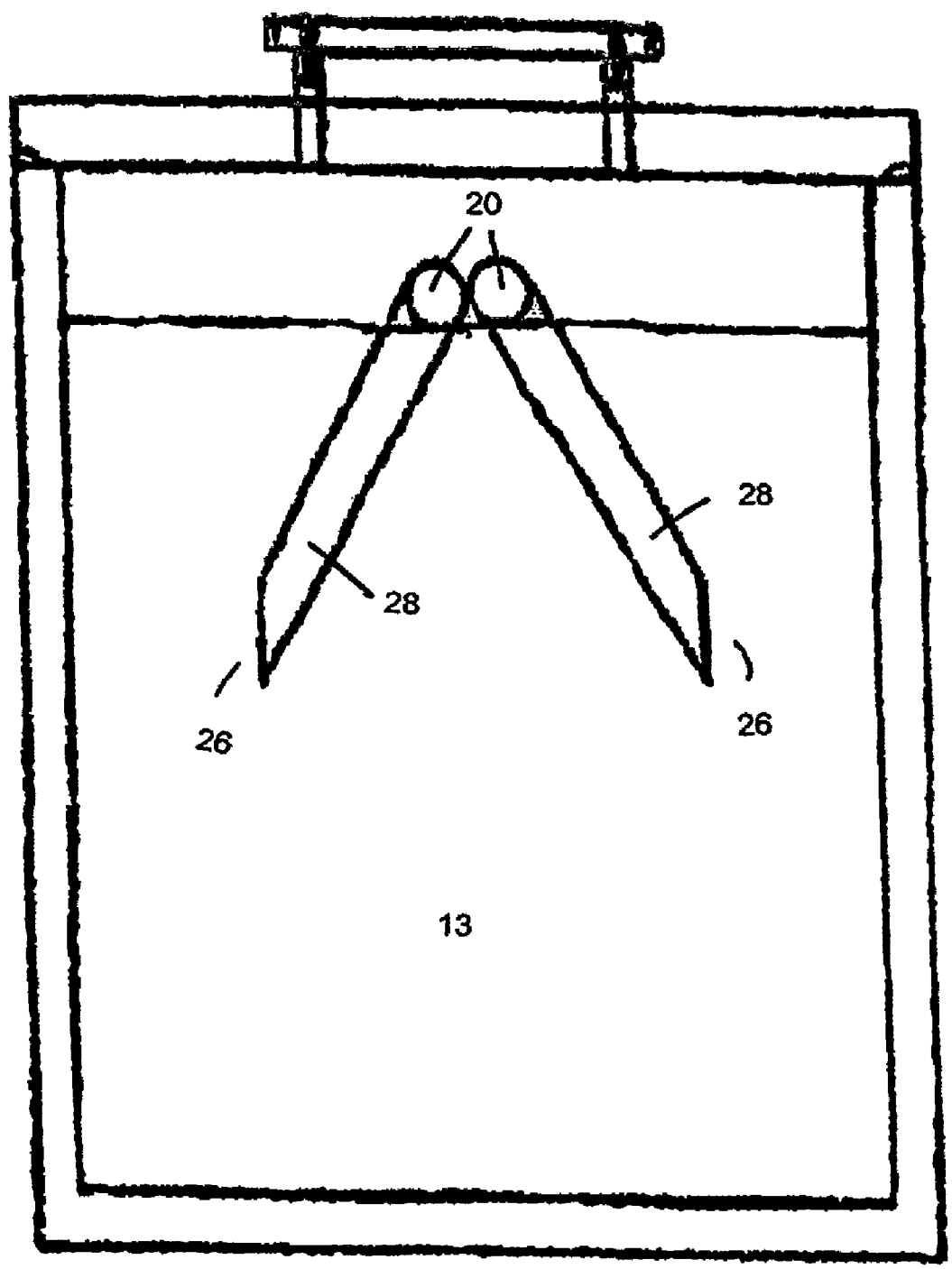
Figure 3F:
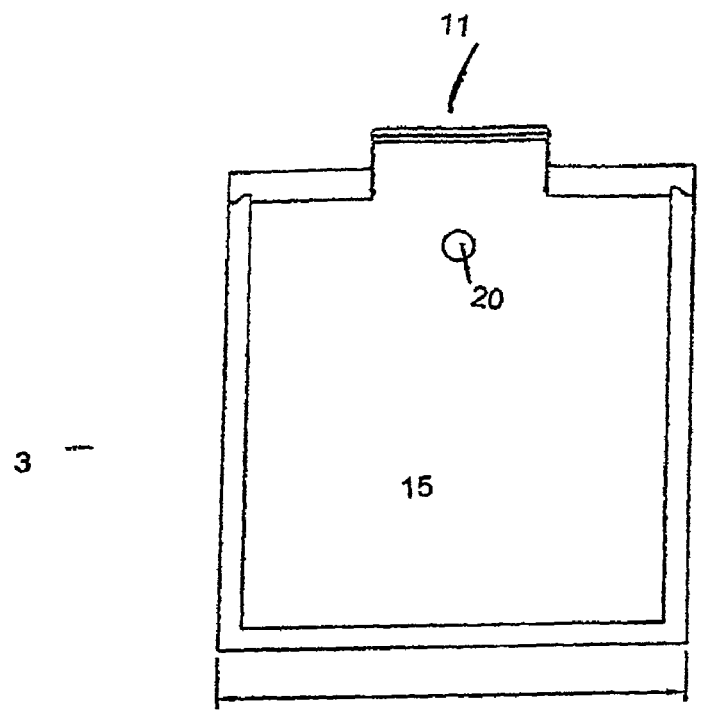
FIG. 3F is a view of the end sectional view of a primary treatment unit according to one embodiment of the present invention.
Figure 3G:
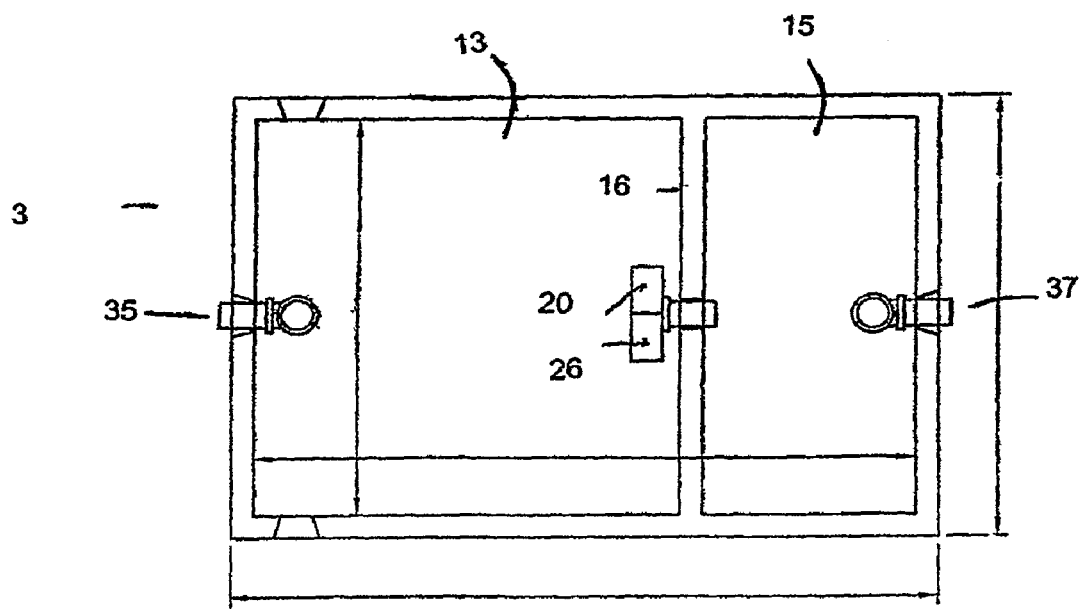
FIG. 3G is a plan view of the inside of a primary treatment unit according to one embodiment of the present invention.
Figure 4:
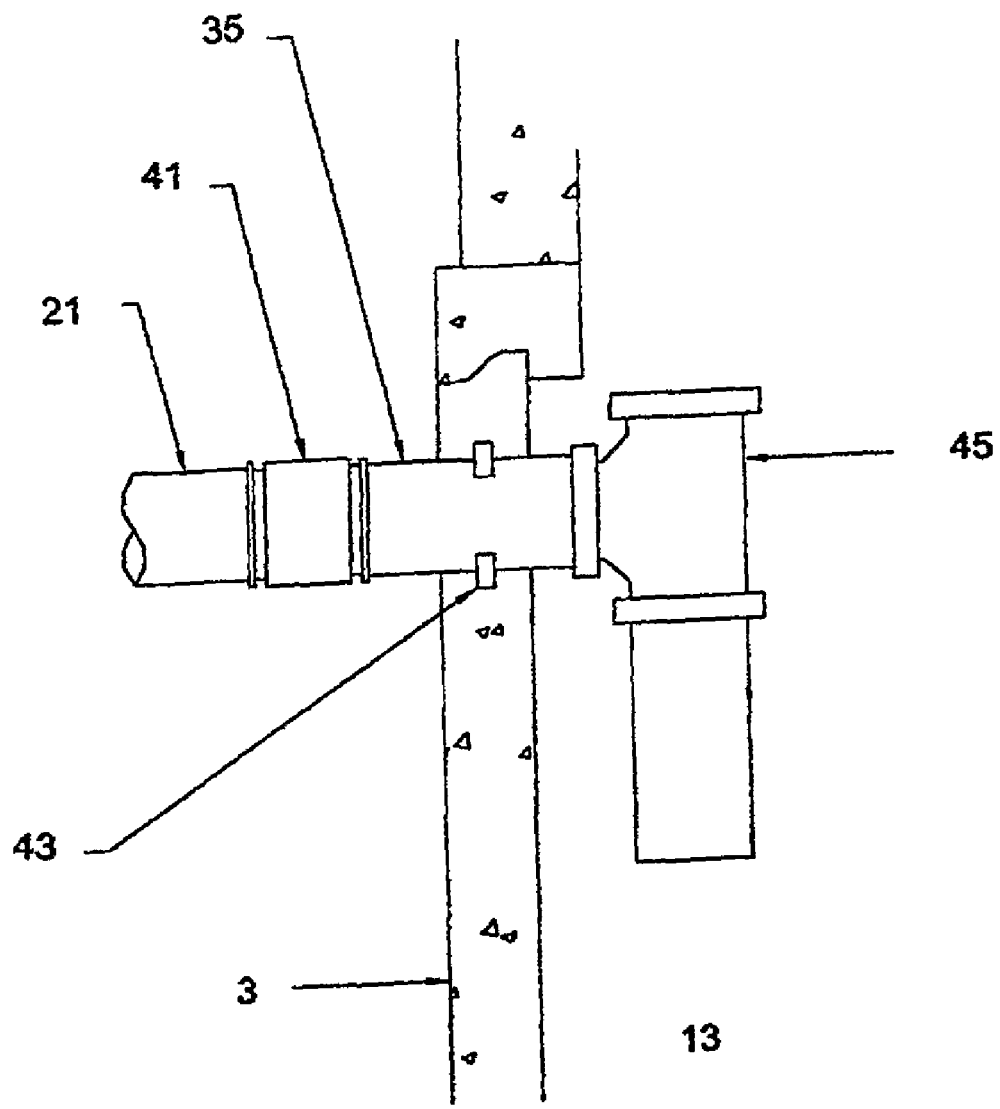
FIG. 4 is a schematic diagram of an inlet connection from a residential building sewer pipe to the primary treatment unit from FIG. 1.

With reference to FIGS. 3C-E, in one embodiment of the present invention, the one or more tubes 28 can be positioned during manufacturing at an angle relative to the vertical axis of the primary treatment unit. As the sewage separates into the respective layers, sludge degradation results in the formation of gases such as carbon dioxide. Particulate matter can attach to gas bubbles, which rise towards the scum layer. Some bubbles containing particles rise into the tubes but, due to the angle of the tube and opening 26, many bubbles are deflected and/or burst prior to entering into the second compartment 15. In this manner, suspended particulate matter which was attached to the gas bubbles is prevented from entering into the second compartment 15. This provides another means of reducing the TSS levels in the liquid sewage leaving the primary treatment unit and also reduces the frequency of sludge removal from the second compartment 15.

In one embodiment of the present invention, the angle of the one or more tubes, relative to the vertical axis of the primary treatment unit, is between 15 degrees and 75 degrees. In one embodiment of the present invention, the angle of the one or more tubes, relative to the vertical axis of the primary treatment unit, is between 1 degree and 5 degrees. In one embodiment of the present invention, the angle of the one or more tubes, relative to the vertical axis of the primary treatment unit, is between 5 degrees and 10 degrees. In one embodiment of the present invention, the angle of the one or more tubes, relative to the vertical axis of the primary treatment unit, is between 10 degrees and 15 degrees. In one embodiment of the present invention, the angle of the one or more tubes, relative to the vertical axis of the primary treatment unit, is between 15 degrees and 20 degrees. In one embodiment of the present invention, the angle of the one or more tubes, relative to the vertical axis of the primary treatment unit, is between 20 degrees and 25 degrees. In one embodiment of the present invention, the angle of the one or more tubes, relative to the vertical axis of the primary treatment unit, is between 25 degrees and 35 degrees. In one embodiment of the present invention, the angle of the one or more tubes, relative to the vertical axis of the primary treatment unit, is between 35 degrees and 45 degrees. In one embodiment of the present invention, the angle of the one or more tubes, relative to the vertical axis of the primary treatment unit, is between 45 degrees and 55 degrees.

In one embodiment of the present invention, the angle of the one or more tubes, relative to the vertical axis of the primary treatment unit, is at least 5 degrees. In one embodiment of the present invention, the angle of the one or more tubes, relative to the vertical axis of the primary treatment unit, is at least 10 degrees. In one embodiment of the present invention, the angle of the one or more tubes, relative to the vertical axis of the primary treatment unit, is at least 20 degrees. In one embodiment of the present invention, the angle of the one or more tubes, relative to the vertical axis of the primary treatment unit, is at least 30 degrees. In one embodiment of the present invention, the angle of the one or more tubes, relative to the vertical axis of the primary treatment unit, is at least 40 degrees. In one embodiment of the present invention, the angle of the one or more tubes, relative to the vertical axis of the primary treatment unit, is at least 50 degrees. In one embodiment of the present invention, the angle of the one or more tubes, relative to the vertical axis of the primary treatment unit, is at least 60 degrees.

With reference to FIG. 3D, in one embodiment of the present invention, one or more tubes 28 are attached to one conduit 20 as illustrated in FIG. 3D.

With reference to FIG. 3C, in one embodiment of the present invention, two or more tubes 28 lead to two or more conduits 20 which can be either spaced apart as in FIG. 3C or adjacent to each other as in FIG. 3E.

In one embodiment of the present invention, the one or more tubes 28 may be parallel to the wall 16 as in FIG. 3B or at an angle directed towards the interior of compartment 13 as in FIG. 3C.

In one embodiment of the present invention, the angle of the one or more tubes relative to the wall separating the first compartment from the second compartment is at least 5 degrees. In one embodiment of the present invention, the angle of the one or more tubes relative to the wall separating the first compartment from the second compartment is at least 10 degrees. In one embodiment of the present invention, the angle of the one or more tubes relative to the wall separating the first compartment from the second compartment is at least 15 degrees. In one embodiment of the present invention, the angle of the one or more tubes relative to the wall separating the first compartment from the second compartment is at least 20 degrees. In one embodiment of the present invention, the angle of the one or more tubes relative to the wall separating the first compartment from the second compartment is at least 25 degrees. In one embodiment of the present invention, the angle of the one or more tubes relative to the wall separating the first compartment from the second compartment is at least 30 degrees. In one embodiment of the present invention, the angle of the one or more tubes relative to the wall separating the first compartment from the second compartment is at least 40 degrees. In one embodiment of the present invention, the angle of the one or more tubes relative to the wall separating the first compartment from the second compartment is at least 50 degrees. In one embodiment of the present invention, the angle of the one or more tubes relative to the wall separating the first compartment from the second compartment is between 1 degree and 5 degrees. In one embodiment of the present invention, the angle of the one or more tubes relative to the wall separating the first compartment from the second compartment is between 5 degrees and 10 degrees. In one embodiment of the present invention, the angle of the one or more tubes relative to the wall separating the first compartment from the second compartment is between 10 degrees and 15 degrees. In one embodiment of the present invention, the angle of the one or more tubes relative to the wall separating the first compartment from the second compartment is between 15 degrees and 20 degrees. In one embodiment of the present invention, the angle of the one or more tubes relative to the wall separating the first compartment from the second compartment is between 20 degrees and 25 degrees. In one embodiment of the present invention, the angle of the one or more tubes relative to the wall separating the first compartment from the second compartment is between 25 degrees and 30 degrees. In one embodiment of the present invention, the angle of the one or more tubes relative to the wall separating the first compartment from the second compartment is between 30 degrees and 35 degrees. In one embodiment of the present invention, the angle of the one or more tubes relative to the wall separating the first compartment from the second compartment is between 35 degrees and 40 degrees. In one embodiment of the present invention, the angle of the one or more tubes relative to the wall separating the first compartment from the second compartment is between 40 degrees and 45 degrees. In one embodiment of the present invention, the angle of the one or more tubes relative to the wall separating the first compartment from the second compartment is between 45 degrees and 75 degrees.

Inlet and Outlet pipes

With reference to FIGS. 3B, 3G, 4 and 5, inlet and outlet pipes 21 and 23 are attached to the primary treatment unit 3 through an attachment assembly. In one embodiment, the attachment assembly comprises a collar 41, one or more substantially airtight gaskets 43, inlet pipe 35 or outlet pipe 37 and one or more tee pipes 45. The collar 41 fits into the inlet or outlet pipe 35 or 37, which extends through and beyond the side of the primary treatment unit 3. Located on the inside of the primary treatment unit 3 are one or more tee pipes 45 which connect to the collar 41 through the inlet or outlet pipe 35 or 37. The seal between the inlet 35 or outlet pipe 37 and the primary treatment unit 3 can be made substantially airtight by the utilization of one or more gasket 43. In one embodiment, of the present invention an A-LOK gasket is used. With regard to FIG. 5, the diameter of lateral sewer pipe 23 is less than the diameter of outlet pipe 37. A bell shaped connector 42 is used to connect the two pipes 37 and 23 together. The outlet pipe 37, and the collar 41, or bell shaped connector 42, are heat welded or, by use of another suitable method, fused with pipe 23. Substantial airtightness of all connections in the sewer system can be tested on site in a manner similar to that of testing the integrity of septic or clarifier tanks, i.e., a vacuum test, which would be known to a worker skilled in the art. The portion of the sewer is sealed, a vacuum is applied and periodic readings with a gauge are used to determine whether the section is losing its vacuum. Results can be achieved immediately.

In one embodiment of the present invention, a conduit as described above is connected to the outlet pipe rather than one or more tee pipes.

In one embodiment of the present invention, the inlet pipe and outlet pipe are constructed of flexible HDPE. The use of flexible pipe at the inlet and outlet points of the primary treatment unit prevents shearing that might otherwise occur as the primary treatment unit or pipe settles or shifts in the ground following installation thereof. A worker skilled in the art would be aware of normal ranges of differential movement based on the individual soil conditions present at installation and would provide sufficient slack in the inlet and outlet pipes to compensate for such movement.

In one embodiment of the present invention, multiple sealing means are provided to seal the connection between the primary treatment unit and the inlet and outlet pipes in order to account for excessive differential movement between the pipes and the primary treatment unit, due to for example thermal expansion and ground freezing. A worker skilled in the art would be aware of appropriate sealing means necessary to provide a substantially airtight seal, for example without limiting the foregoing, gaskets, flexible membranes and the like.

In one embodiment of the present invention, the sealing means is sufficiently flexible to compensate for relative movement between the pipe and the primary treatment unit in the plane of the wall of the primary treatment unit while still maintaining a substantially airtight seal.

In one embodiment of the present invention, the sealing means is sufficiently flexible to compensate for relative movement between the inlet and outlet pipes and the primary treatment unit perpendicular to the plane of the wall of the primary treatment unit while still retaining a substantially airtight seal. This flexibility is necessary to account for thermal expansion coefficient differences between the pipe and the primary treatment unit. The difference in expansion coefficients is a factor of the materials from which the pipes and the primary treatment unit are constructed, as would be known to a worker skilled in the art.

Flow Attenuation Device

Figure 5:
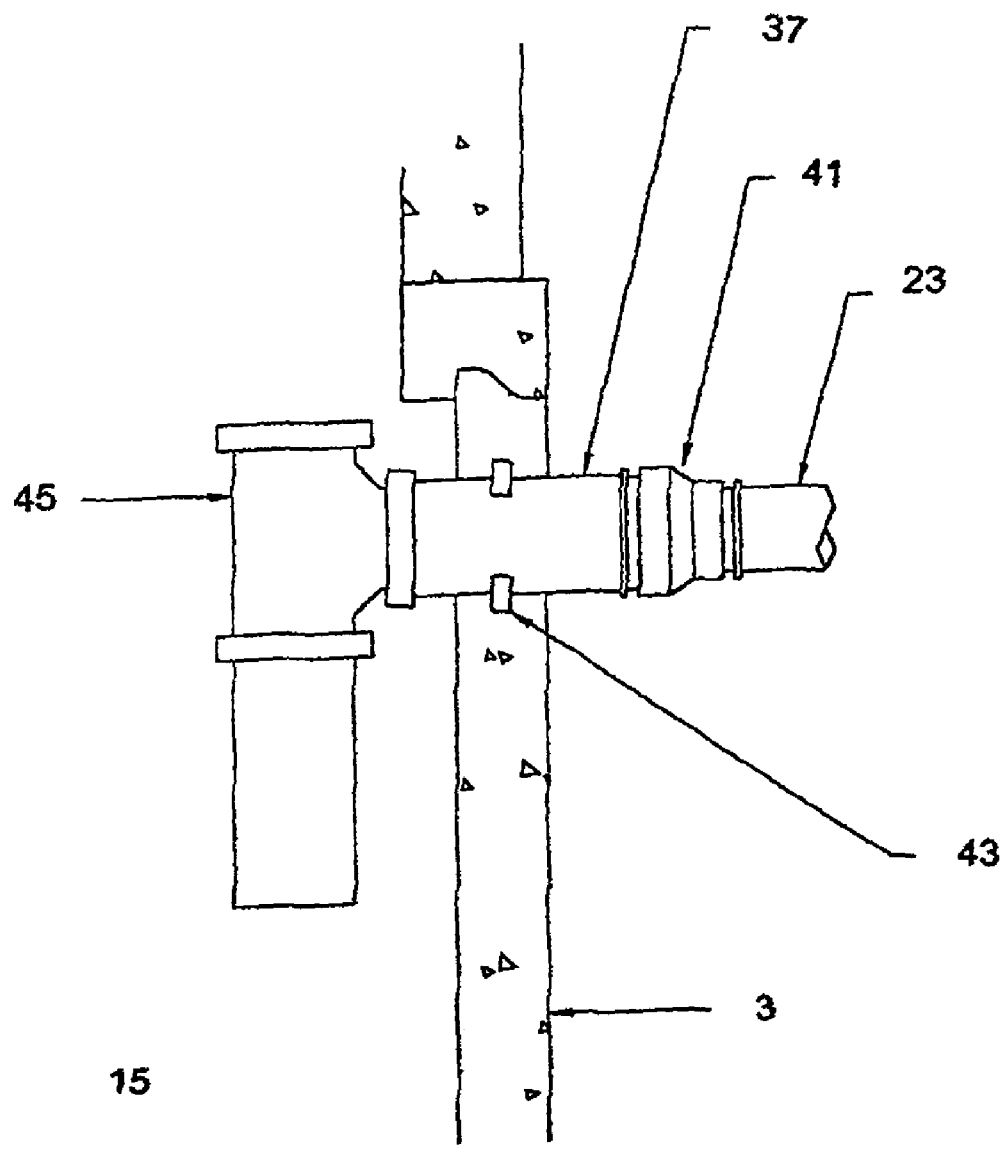
FIG. 5 is a schematic diagram of an outlet connection from the primary treatment unit to lateral sewer pipes from FIG. 1.
Figures 5A, 5B:
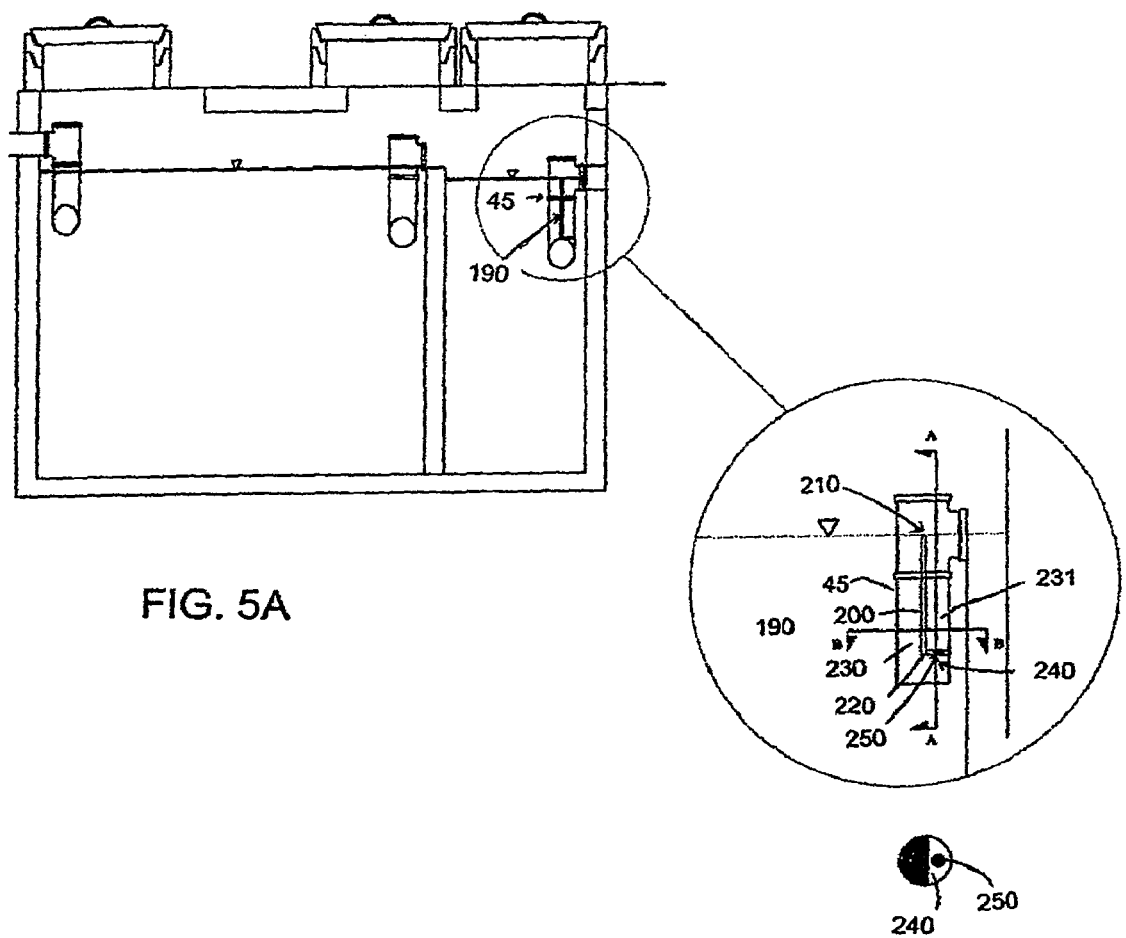
FIG. 5A is a partial cut-away view of the outlet connection from FIG. 5, comprising a flow attenuation device according to one embodiment of the present invention.
FIG. 5B is an enlarged view of the flow attenuation device of FIG. 5A

In one embodiment of the present invention, the primary treatment unit 3 comprises one or more flow attenuation devices 190 that moderate flow rates leaving the primary treatment unit 3. The use of flow attenuation devices 190 has the effect of providing a more consistent flow rate of the liquid effluent leaving the primary treatment unit 3, enabling smaller pipe sizes throughout the system 1, substantially eliminating instantaneous surge loads, and enhancing peak shifting. This feature can allow the system according to the present invention to be connected as an addition to an existing sewer system that is near its peak capacity, because the liquid effluent from the system 1 enters the existing sewer network during non-peak periods, thus substantially minimizing additional burden on the existing system and on downstream sewage treatment centres. With reference to FIGS. 5A and 5B, in one embodiment, a flow attenuation device 190 is integrated into the outlet tee pipe 45 wherein the interior of the outlet tee pipe 45 comprises one or more partitions 200, that divide the outlet 45 along its longitudinal axis into two or more sections 230, 231. The one or more partitions comprise a top edge 210 located nearest to the top of the primary treatment unit 3 and an opposing lower edge 220. At least one of said one or more sections 231 of said tee pipe 45 possesses a plug 240 that prevents liquid effluent from entering the section 231. Said plug 240 comprises one or more orifices 250 that limit the flow of liquid effluent into the section 231. As a hydraulic load is placed on the primary treatment unit 3, liquid effluent initially has a period of restricted flow through the one or more orifices 250. The one or more partitions 200 are designed such that the top edge 210 of the one or more partitions 200 is higher than the point at which the tee pipe 45 connects to the outlet pipe 37. The one or more partitions 200 may be used as an overflow mechanism during sustained high hydraulic loading and the top edge 210 of the one or more partitions 200 may be cut horizontally or be equipped with a weir or an equivalent graduated flow mechanism.

In one embodiment of the present invention, the flow attenuation device comprises a plug 240 including one or more orifices 250, that seals the opening of the tee pipe 45 closest to the bottom of the primary treatment unit. In this embodiment, overflow access is provided at the opposing opening of the tee portion 45.

In one embodiment of the present invention, the flow attenuation device comprises an effluent filter embedded with weirs or equivalent graduated flow mechanisms.

With reference to FIGS. 5C and 5D, in one embodiment of the present invention, the flow attenuation device 191 consists of a restricted diameter weeping tube or siphon 195 that connects between the tee pipe 45 through the wall of the primary treatment unit 3 to the outlet pipe 23, creating a drawdown zone between the height of the weeping tube 195 and the height of the outlet pipe 23 at the point of connection to the primary treatment unit 3.

Flexible Pipe

In one embodiment of the present invention, pressure rated high density polyethylene (HDPE) pipe, typically between 50-150 mm in diameter, is used as the collection main. The pipe is flexible and in one embodiment, is available for installation in coils of up to 300 m in length, requiring a substantially minimizing joints between sections of pipe and minimizing the extent of required open excavation and surface reinstatement. Such lengths of pipe may be preferred in rural communities where the distance between residences is typically larger than in an urban environment.

Figure 11:
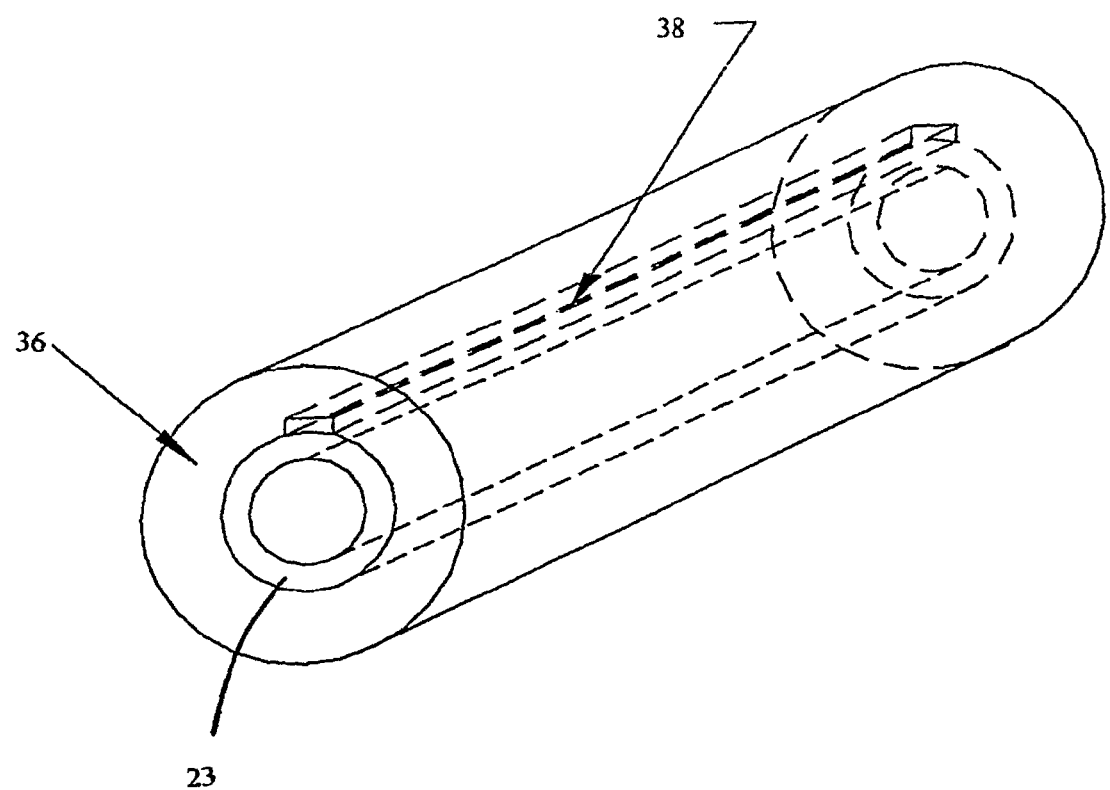
FIG. 11 is a schematic diagram of a section of insulated and heated pipe according to an embodiment of the present invention.

As is known, it is important to prevent the sewage and liquid effluent from freezing within the pipe of the sewer system. Freezing can result in solid volume expansion, causing cracked pipes and blockages in the system. Normally, the elements of the sewer system are insulated by the surrounding soil and are placed beneath the frost line to eliminate the consequences of freezing. However, extra protection from low temperatures may be desired. With reference to FIG. 11, in one embodiment the collection main 25 is sheathed in insulating material 36, such as Styrofoam. In an alternative embodiment of the present invention, the collection main 25 can further comprise a heating means 38.

The flexibility of the pipe enables the design of the system to take into account the topography and the geology of the land to optimize the flow of liquid through the system.

Installation can be accomplished by means known to the skilled worker including one or more of horizontal directional drilling or open trench excavation. In one embodiment, horizontal drilling techniques can be used to reduce installation time, minimize disruption to residents or local businesses and substantially reduce surface reinstatement costs.

In one embodiment, the collection means can be designed with non-corrodible components and has a design life of over fifty years. The system can be designed in such a manner that post-construction pipe settling does not have an adverse affect on the hydraulic performance of the sewer system.

Connections and joints are sealingly connected for example by butt-fused (welded) or other connection sealing method known to the skilled worker in this art. The substantial airtightness of connections between sections of pipe can be verified on site using a vacuum test as discussed above.

The liquid effluent 7 flows out of the primary treatment unit 3 and into the lateral sewer pipe 23 which carries it to the collection main 25 shown in FIG. 1A. The lateral sewer pipe 23 and collection main 25 (in FIG. 2, lateral pipe 23 is shown in more detail) can be flexible and substantially smaller in diameter than historic sewer pipes. They can be made of HDPE and their joints are sealingly formed, for example by heat welding or other technique known to a worker skilled in the art, thereby substantially eliminating any infiltration of groundwater and exfiltration of liquid effluent from the sewer system. In one embodiment, all jointing in the sewer system 1 is chemically welded or heat welded. In one embodiment, pipes 23 and 25 are flexible, and therefore do not need to be placed in straight alignment as do historic sewer pipes. Accordingly, this format of piping may deviate from a straight path to avoid obstacles or for ease of installation, for example.

Vents

Venting is required in order to allow flow to occur throughout the system without air locks. Since the system is pressure tested to be air tight when sealed, and is thus leak-proof, venting is required, especially in areas of inflection, in areas after turbulent flow or in open flow. Venting is provided at critical locations in the system such as at the primary treatment unit, specific areas along the collection main (through a standpipe or lateral vent) through maintenance clean-outs and at pumping stations. Venting allows both positive and negative air flow within the system depending on the vent location and effluent flow directions. The vents enable air to flow through the system and are positioned in a manner to support the continuous flow of liquid effluent through the system. For example, if a location in the system has two or more pipes merging in an orientation such that water can form a block in the system, the proximal location of a vent can prevent hydraulic lock from occurring. Vents are designed to enable gas exchange between the sewer system and the surrounding environment but configured to prevent the escape of sewage or liquid effluent from the system or the inflow of groundwater into the system.

Figure 6A:
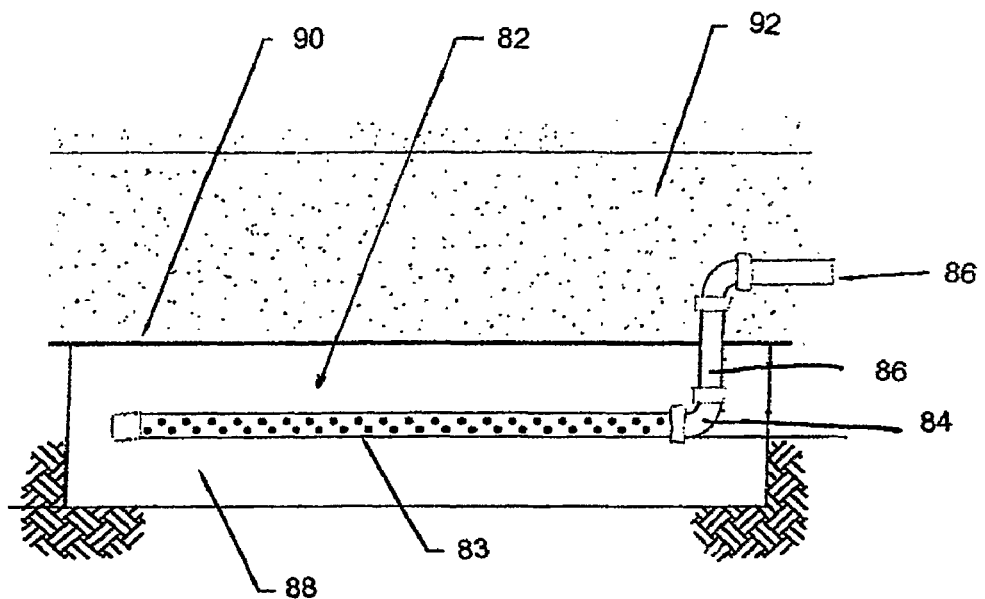
FIG. 6A is a side perspective view of a soil filter and vent for the system according to one embodiment of the present invention.
Figure 6B:
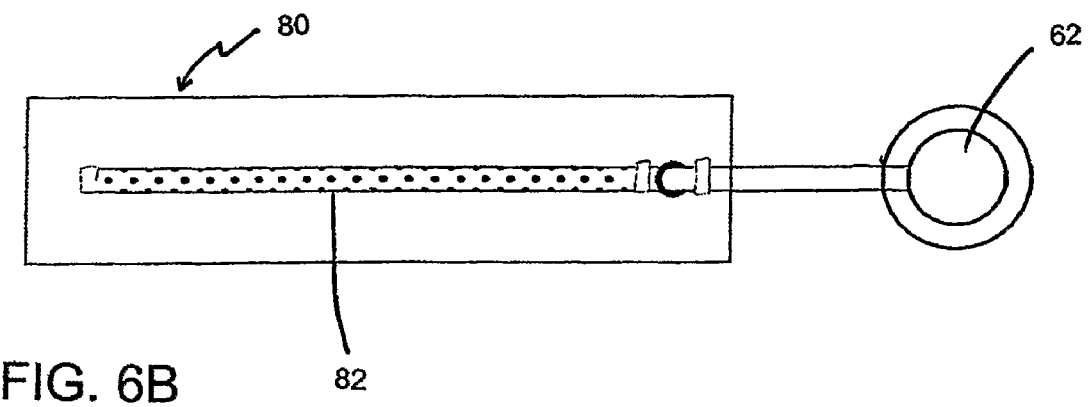
FIG. 6B is a plan perspective view of a soil filter and vent for the system according to one embodiment of the present invention.

With reference to FIGS. 6A and 6B, in one embodiment of the present invention, there is provided a lateral vent 82 comprised of a perforated pipe 83 located in a bed of clear stones 88. The vent 82 is connected to the sewer system by means of elbow joints 84 and pipe 86 connected in such a way as to prevent the infiltration of groundwater and the exfiltration of liquid effluent into the surrounding environment. The configuration of elbow joints 84 and pipe 86 necessary to prevent this will depend to some degree on the placement of the vent within the system and would be well known to a worker skilled in the art.

In one embodiment of the present invention, the vent extends above the soil line and is housed within an above-grade container. Vented air is passed through activated carbon or similar odour filtering material. The odour filter will be encased within the venting stack or contained within a separate chamber through which the vent air must pass. The vented area can consist of a perforated pipe section, a perforated cap placed at the top of the venting stack or a ventilated chamber.

Clean-Outs

In one embodiment, the system further comprises sealed maintenance clean-outs which are provided to accomplish a similar function as maintenance holes or manholes in historic sewer systems. The clean-outs are constructed of suitable material such as high-grade, durable plastic. The clean-outs can be installed off the roads in grass boulevard or rear yard areas and thus do not suffer from road traffic deterioration typical of standard manholes. According to the installation environment and the length of each pipe coil, clean-outs may be installed 100 m to 300 m or more apart, also depending on the venting requirements. The clean-outs provide easy access for routine flushing, which may occur every 7-10 years, after desludging of the upstream primary processing units.

Figure 8A:
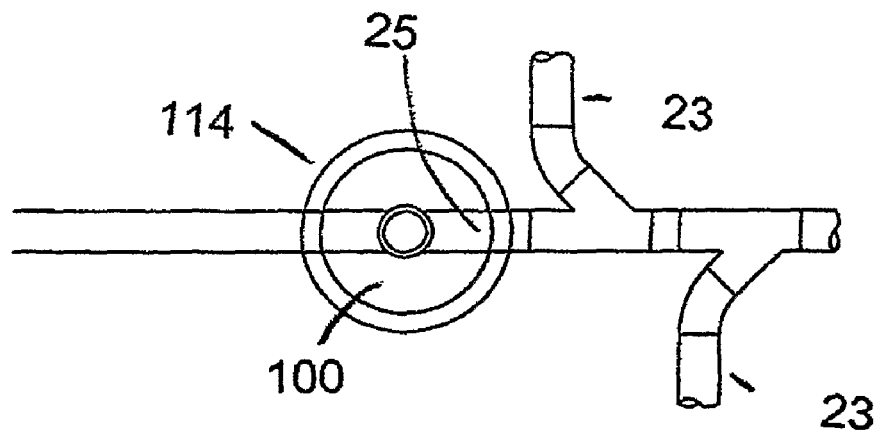
FIG. 8A is a plan schematic view of a manhole and cleaning system according to one embodiment of the present invention.
Figure 8B:
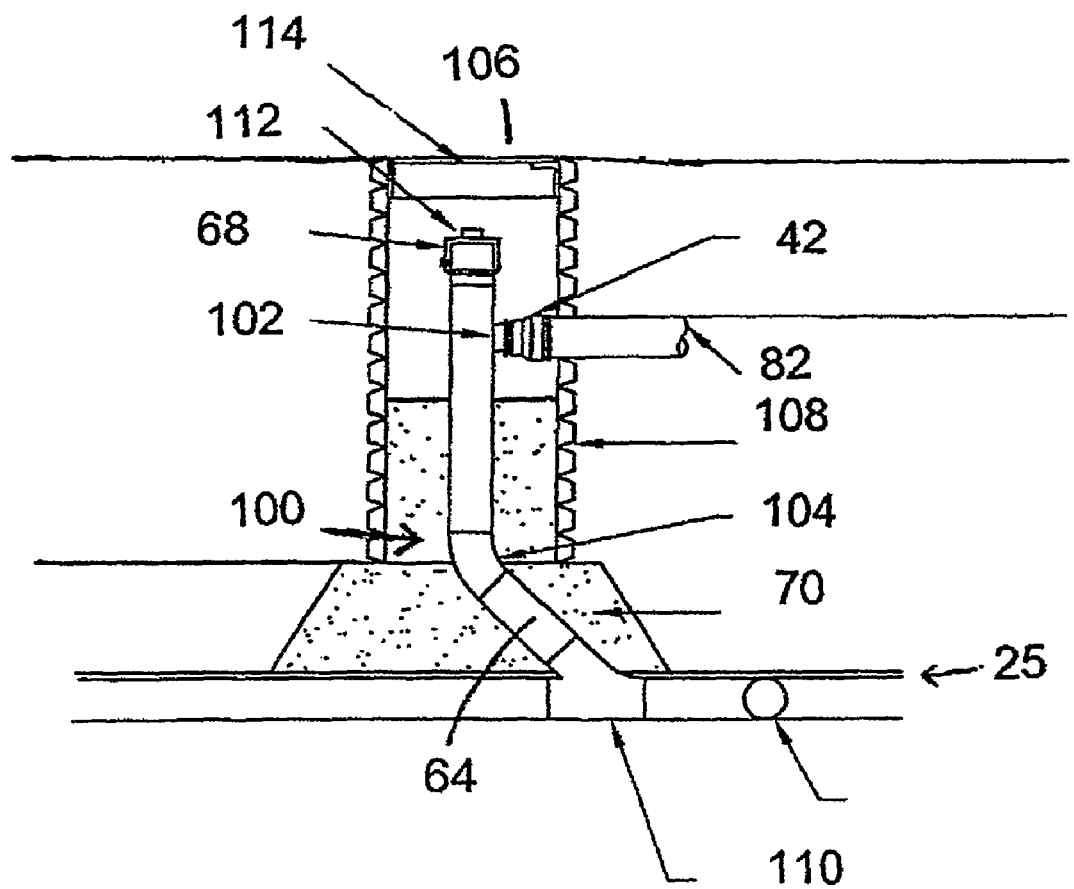
FIG. 8B is a side cross sectional view of a manhole and cleaning system according to one embodiment of the present invention.
Figure 9:
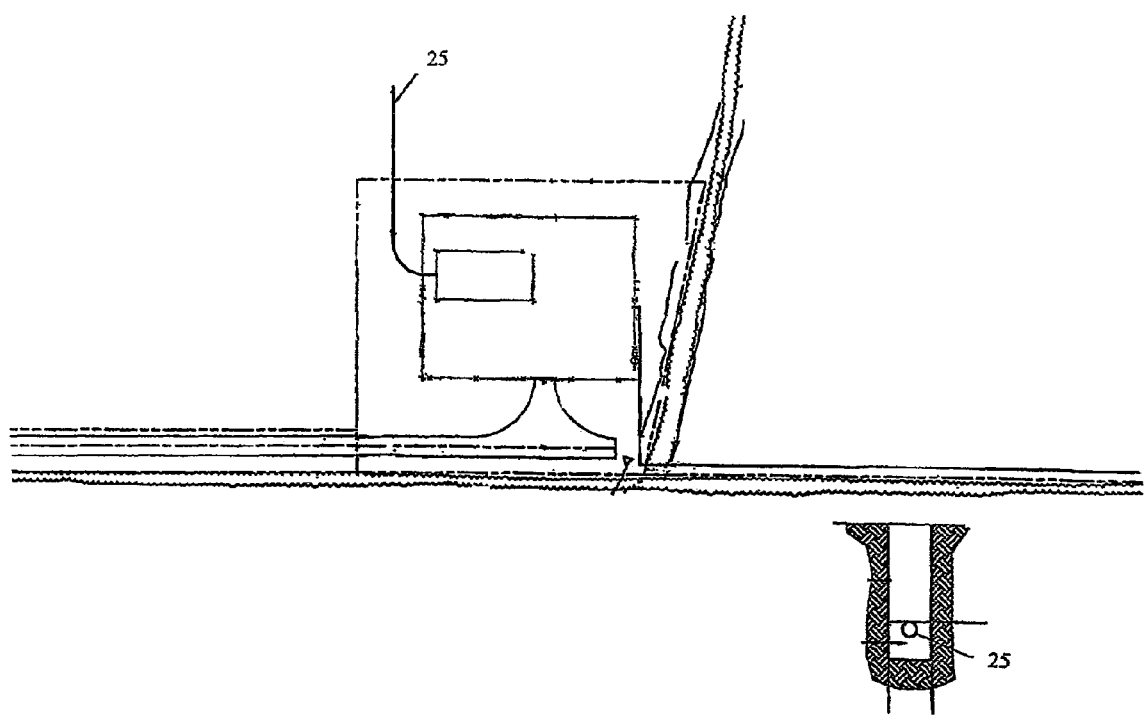
FIG. 9 is a schematic overview of a collection main connected to a treatment plant according to one embodiment of the present invention.
Figure 10A:
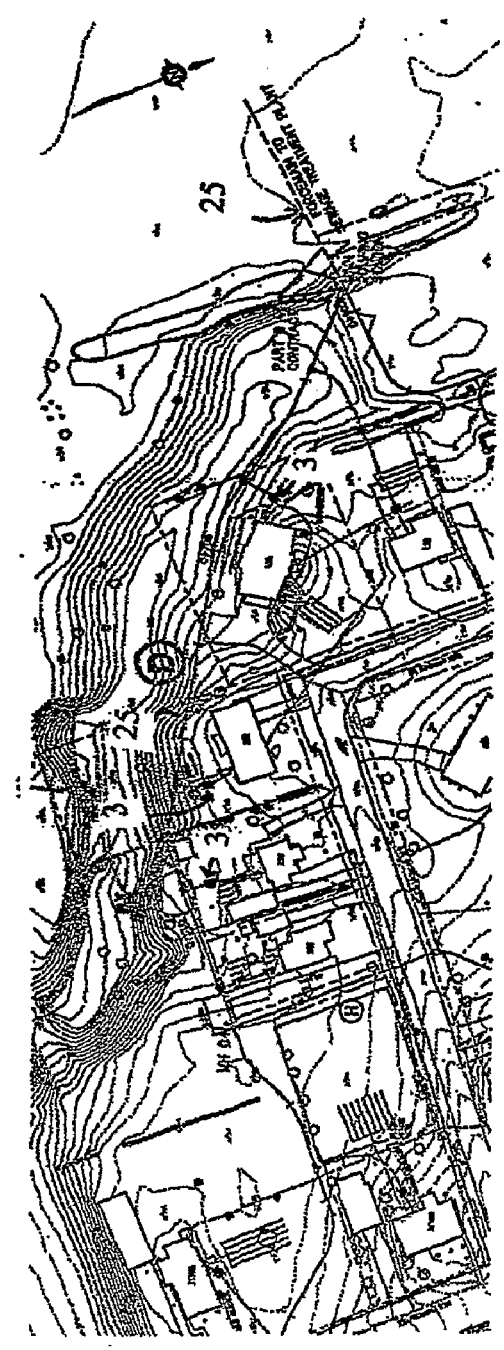
FIGS. 10A-F are topographical and side sectional views of layouts of a high performance gravity sewer system according to one embodiment of the present invention.
Figure 10A:
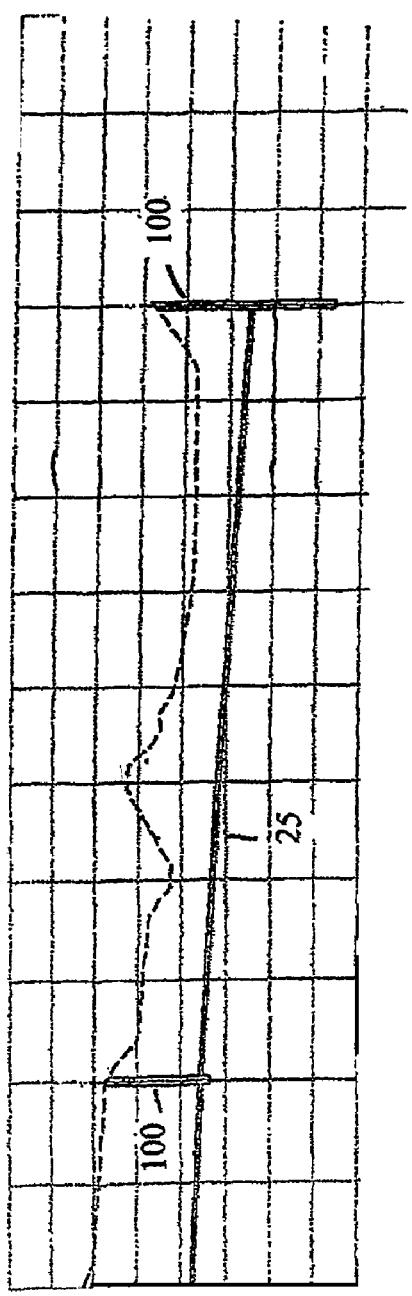
Figure 10B:
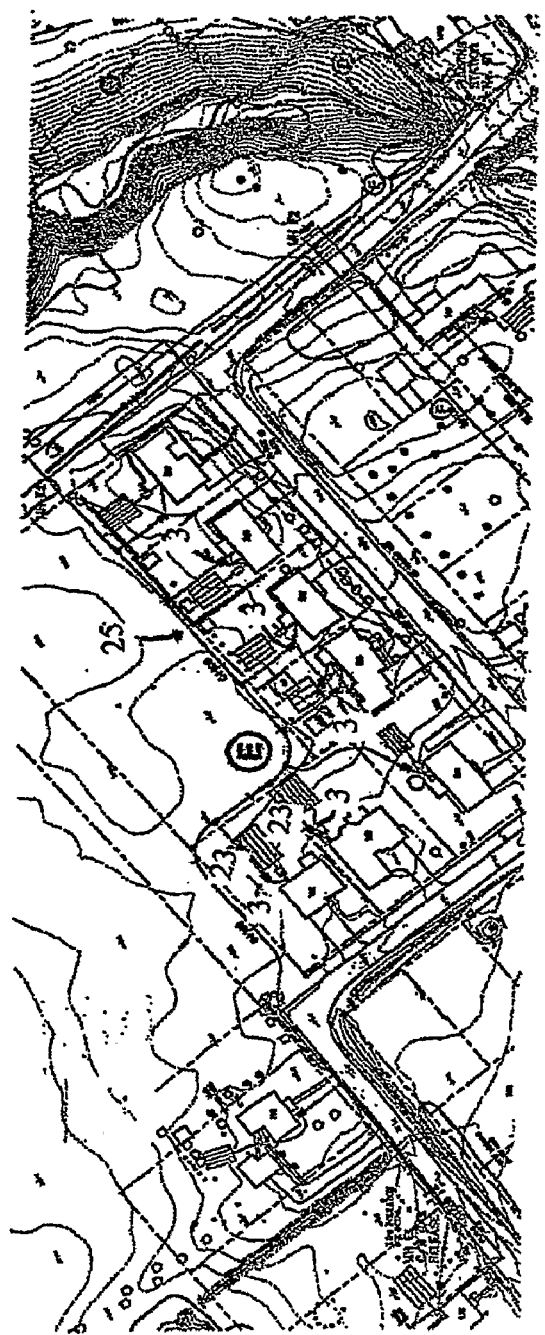
Figure 10B:
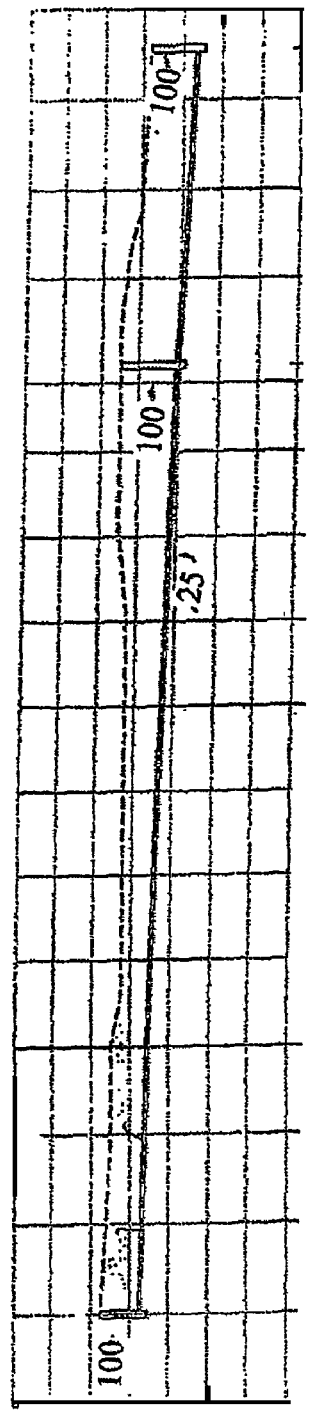
Figure 10C:
Figure 10C:
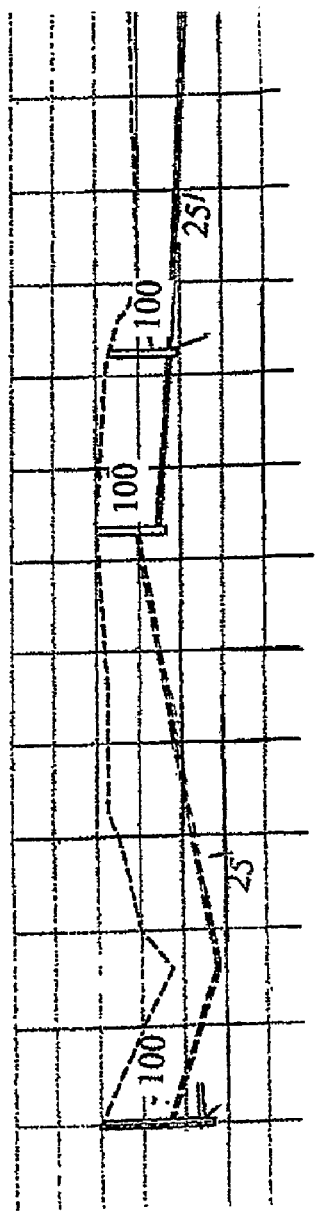
Figure 10D:
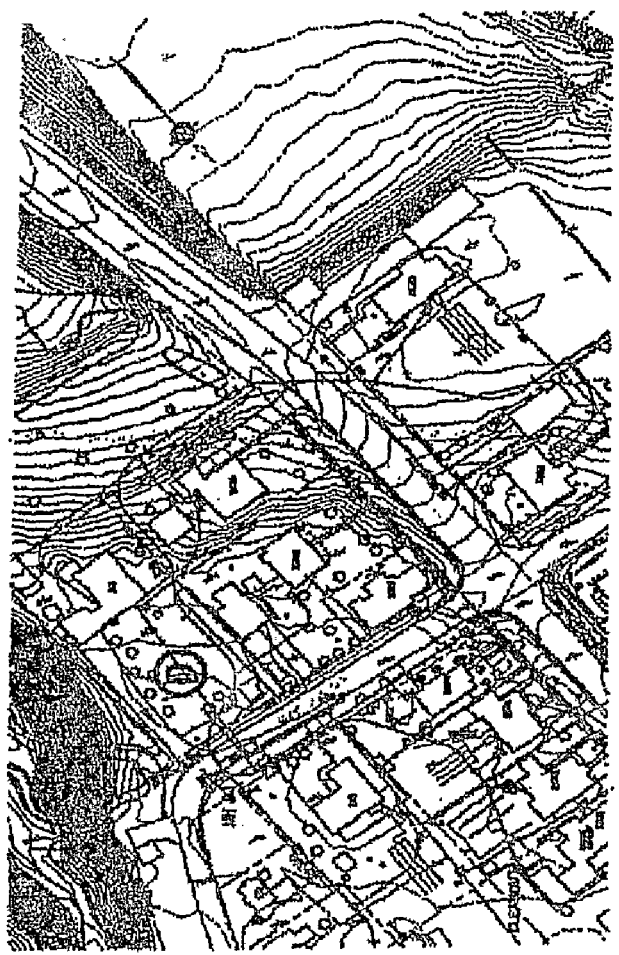
Figure 10D:
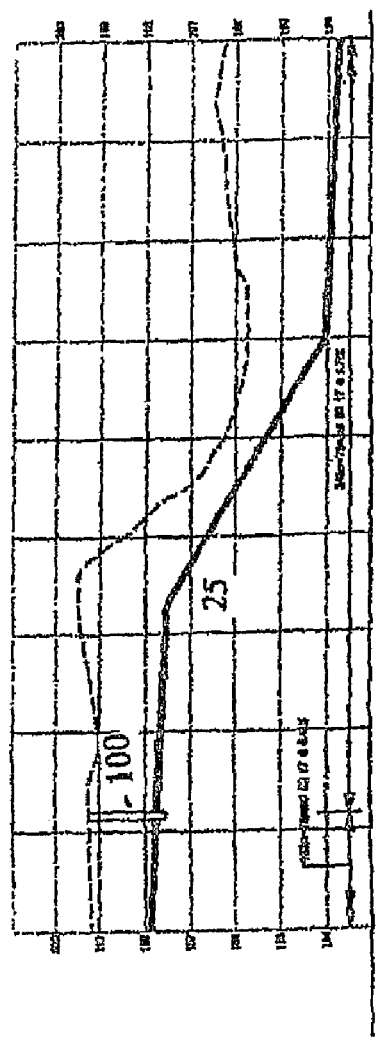
Figure 10E:
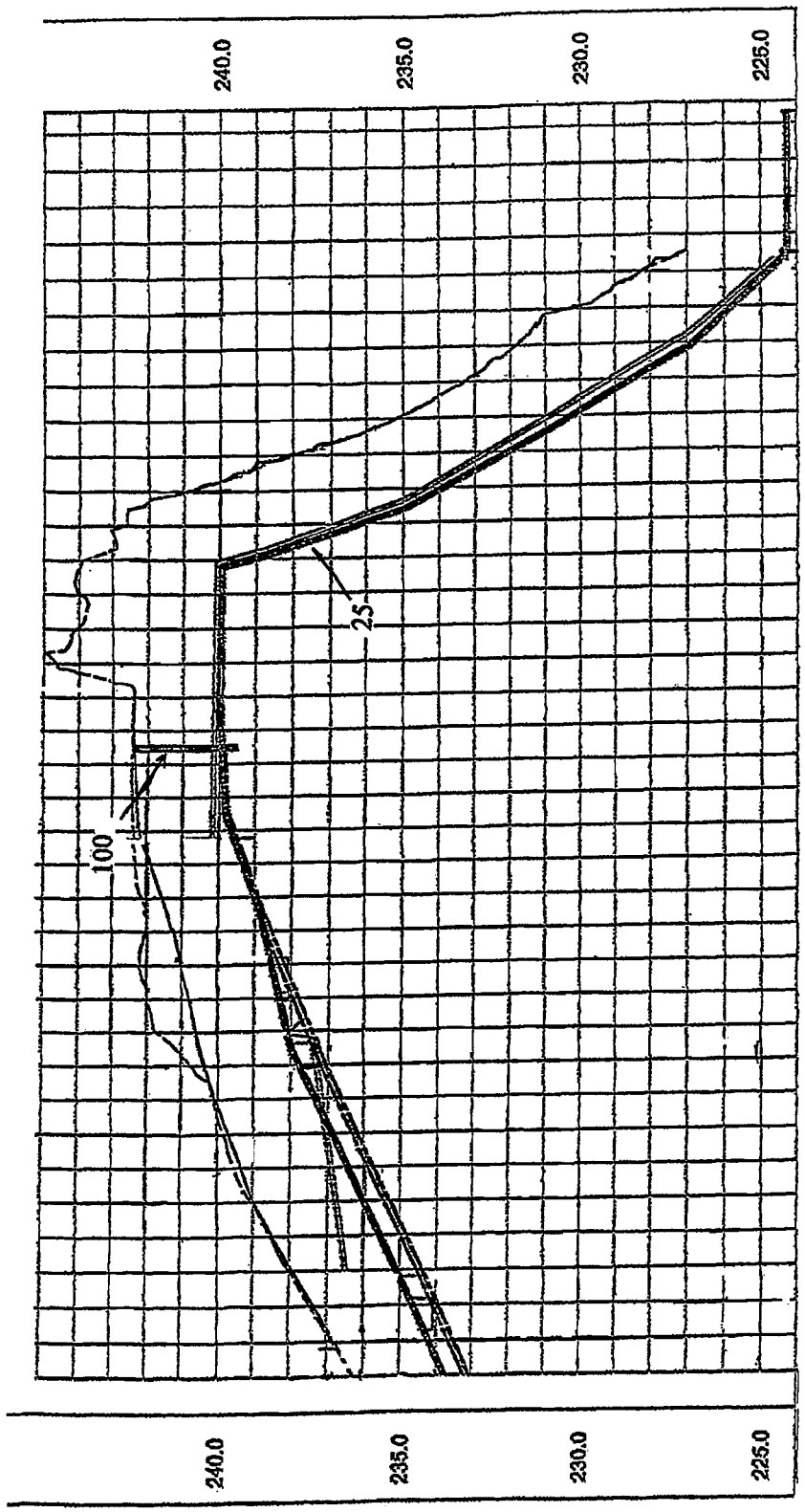
Figure 10F:
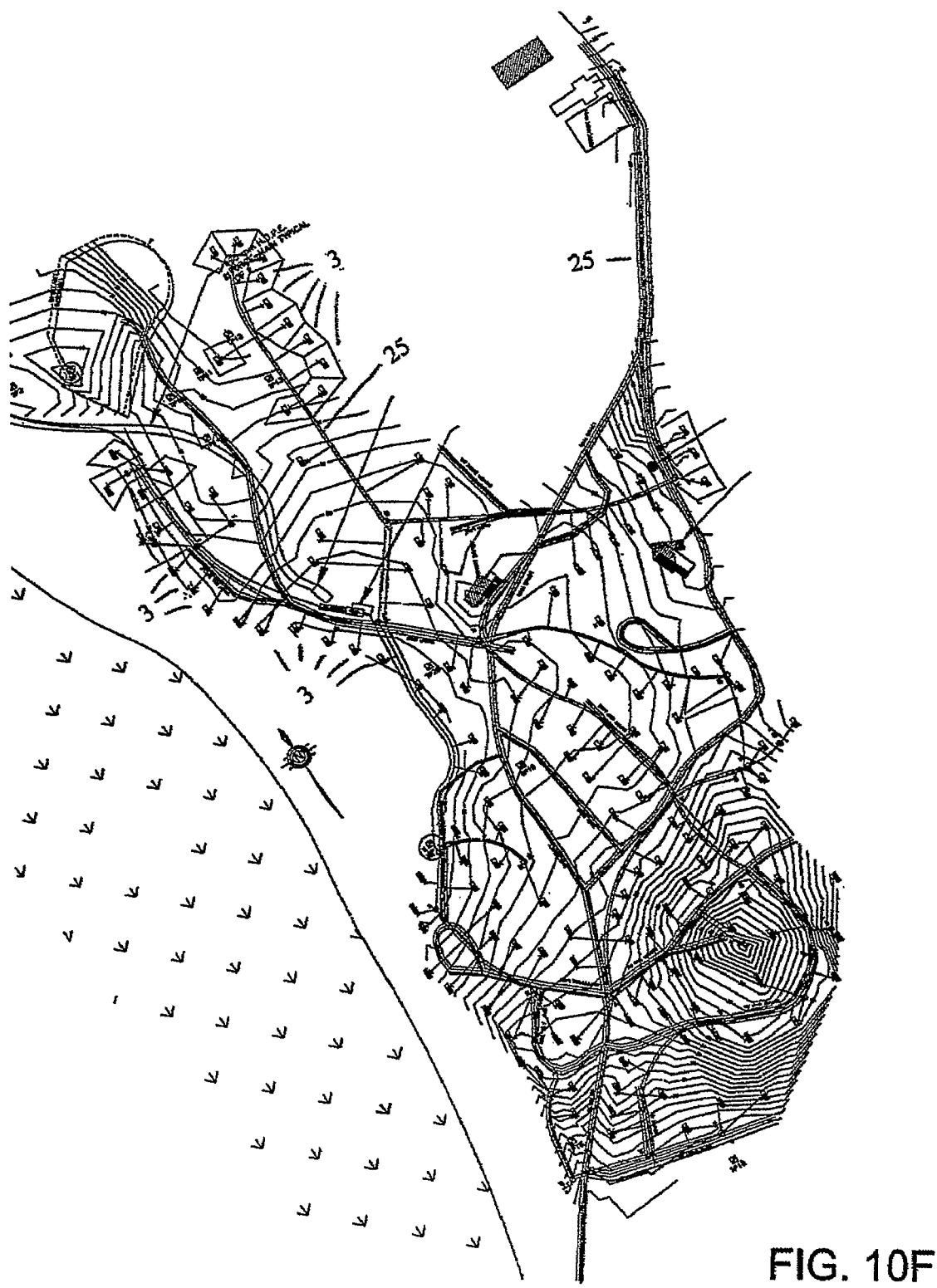

With reference to FIGS. 8A and B, in one embodiment of the present invention, there is provided a clean-out 100 comprising a vertical stand pipe 102 that is connected to a collection main 25 by means of a joint 110 and elbow joint 104. The vertical pipe 102 is sealed with a cap 68 which can optionally comprise a vertical vent 112.

In one embodiment, the stand pipe 102 is additionally composed of an adaptor (not shown) at its upper end to connect to a hose such as a fire hose for easy flushing of the sewer system. The clean-out 100 terminates slightly below the surface of the ground within a frame 114 that is sealed with a cover 106. The frame 114 is composed of a suitably robust material to resist damage and protect the clean out. Examples of suitable materials for the frame 114 can be cast iron, steel, ceramic, plastic and the like. The clean-out 100 can also optionally possess a lateral vent 82 for the venting of gasses. In one embodiment, insulation 69, clear stone 70 and other media can be provided to protect the piping from damage, for example, due to the elements and frost.

Pumping Stations

Figure 12A:
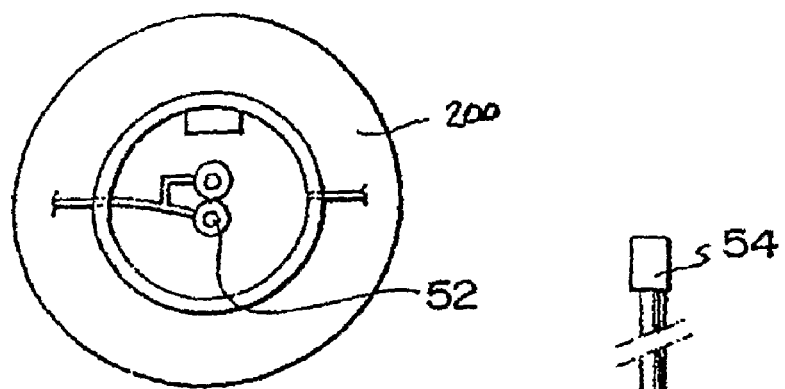
FIG. 12A is a plan view of a pumping station according to one embodiment of the present invention.
Figure 12B:
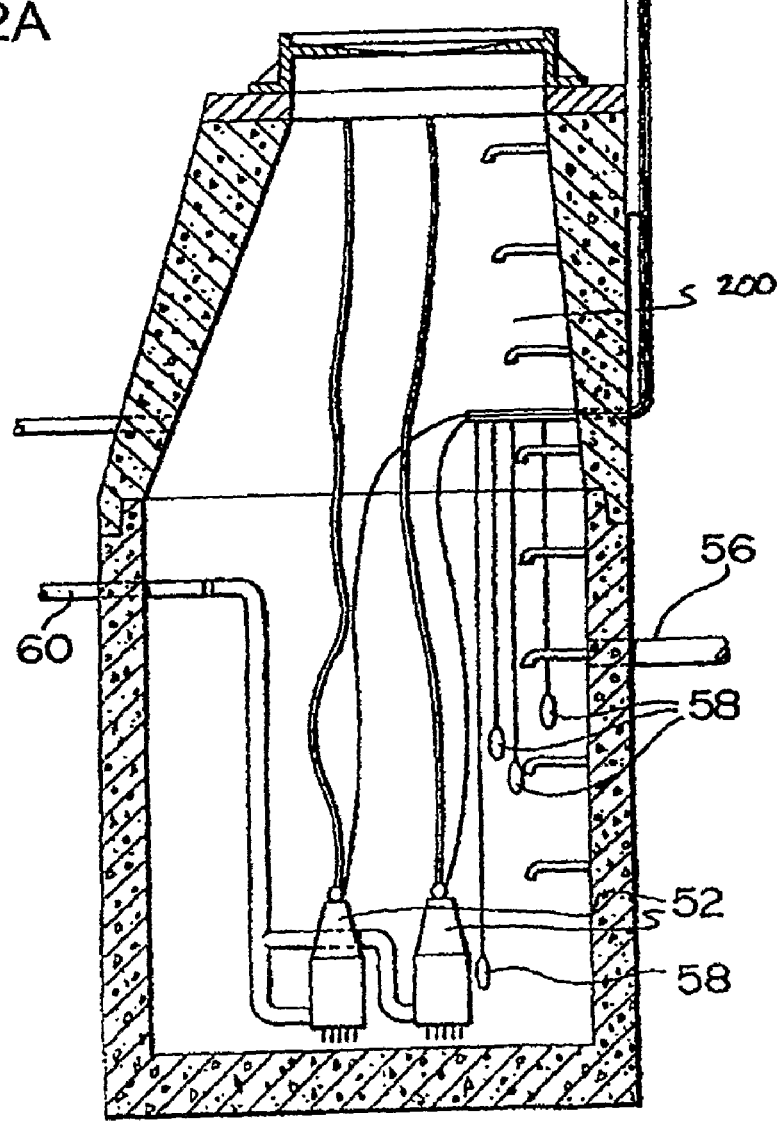
FIG. 12B is a side view of a pumping station according to one embodiment of the present invention.

As detailed in FIGS. 12A and 12B, a pumping station 200 may be inserted into the collection main 25 to aid in the flow of the liquid effluent 7 to a treatment center. A pumping station 200 includes submersible pumps 52 wired to a control panel 54 which is preferably located above ground. An inlet pipe 56 from the collection main 25 discharges liquid effluent 7 into the station 200. The submersible pumps 52 have a series of floats 58 which activate pumps 52 when the level of the liquid effluent 7 in the pumping station 200 reaches predetermined elevations. The liquid effluent 7 is pumped out of the pumping station reservoir and into a forcemain 60 which carries the liquid effluent to a central sewage treatment centre. Gaskets such as A-LOK gaskets are used to maintain airtight connections between the walls of the pumping station 200 and the inlet pipe 56 and the forcemain 60. Because only liquid effluent is pumped through the pumping station, submersible pumps 52 need only be liquid pumps rather than the typically more complex and expensive sewage pumps required in historic sewer systems.

Design of the Layout to Optimize Fluid Dynamics

A method of designing the layout of a high performance sewer system in accordance with the present invention may include some or all of the following steps:

Step 1—Fluid Dynamics

The first step involves determining the impact of the fluid dynamics in various parts of the system, for example, fluid load, changes in fluid volume, air flow, venting, the gradient of the pipe, and the possibility of air lock. For example, as pipe sizing can be considerably smaller in relation to historic sewers, the limitations of smaller piping should be considered together restrictions in grade, flow rates, points of inflection, to determine whether the pipe sizing can be altered in order to provide adequate air venting into the sewer. For example, the use of a 75 mm pipe over a 50 mm pipe could be applied for these reasons. This may occur, as an example, when it is determined that, during periods of high flow, the pipe is over 50% capacity and the pipe can be enlarged without a negative detriment to the ability to provide adequate cleansing velocity. If the system is installed in under unfavorable conditions, then the large pipe diameter may be considered to offset known minor inflections or negative gradients or to provide a degree of flexibility during installation, such a when horizontal directional drilling is used.

Step 2—Local Topography and Geology

The next step involves determining the impact of the local topography and geology of the area including all of the local site conditions, such as geotechnical data, topography, location of existing services and infrastructure, areas of environmental sensitivity, and the like. For example, sensitivity to points of inflection in the sewer should be considered in laying out the sewer system, where sensitivity to grade and other influences to the hydraulic grade line may not exist and a range of latitudes can be defined that may be possible in the design and still maintain functionality of the system. This scenario could occur where the natural topography provides ample grade, and the volume of flow is such that it is unlikely that the negative gradient will cause standing water in the sewer; that is, it is determined that solids accumulation is unlikely and there is sufficient volume of effluent within the section to maintain dynamic flow conditions even where ventilation air may not be adequate. In effect, the overall grade of the sewer and the local circumstance will need to be balanced while considering the impact to the volume of flow and ventilation.

If a large natural grade is found, then gravity flow should be utilized as much as possible, however, in some cases, the effluent will become turbulent and release odours into the atmosphere. In this case, limited venting in close proximity to residences (i.e., not using the residential plumbing as a venting opportunity) is desirable and alternate venting with some form of odour filtration will need to be provided. In addition, for the same reasons the design must ensure that the effluent flows from the residence with limited venting.

If the local geotechnical conditions are not favorable to installation, then the design may tolerate more variance in both horizontal and vertical inflection and make provisions for adequate cleanout of accumulated solids with increased proximity of access points and increased ventilation points in the sewer.

Step 3—Impact of Wastewater Flow

The next step involves determining the impact of wastewater flows per capita, existing water consumptions rates and the optimization of primary treatment unit numbers and sizing. For example, multiple units can be connected to a single tank, and optimization will supply extended sludge and scum holding times, while providing adequate hydraulic residence time for primary clarification in the tank. In addition, the use of the system by mixed industrial and commercial buildings, with the effect of providing consistently low BOD and suspended solids in the effluent should be taken into consideration. For example, if a development consists of a number of residences in close proximity, such as townhouses, then it is often more convenient to have the units using a single, appropriately sized, primary treatment unit. If, in an industrial application, the industrial effluent may generate toxic or environmentally harmful sludges, then it may be desirable to separate the sanitary service from the industrial service by using two units, thus enabling segregation of industrial sludges for enhanced treatment or alternate disposal.

Step 4—Venting Requirements

The next step involves determining the venting requirements of the system and the placement and separation distances between vents so as to be able to select the appropriate vent in different locations of the sewer. For example, at certain points of the sewer, odour control will be a concern and a sub-surface vent may be required. The appropriate vent must be selected based on these factors balanced against the venting needs of the overall system. The placement of energy and hydraulic grade lines can also be considered to ensure that it is sufficiently suitable for negative gradients in the sewer line. It this case, the substantially liquid effluent may fill the pipe and block air venting in this section of the pipe. By considering to what extent flow may be hampered due to lack of sufficient air flow, compensation can be made for a restricted venting areas while maintaining overall adequate flow in the system. This may occur when sufficient flow velocity is available to maintain adequate flow and prevent accumulation of solids in areas of low to negative grade.

Step 5—Access and Maintenance Requirements

The next step involves determining the access point and maintenance serviceability requirements of the system, based on factors such as which portions of the sewer may be vulnerable to solids accumulation, the necessity of providing proper access to the sewer, spacing of cleanouts servicing requirements and readily available servicing equipment, the need for inspection points and other tools or methods for diagnostic repairs such as CCTV inspection and sewer line flushing;

Step 6—Materials and Techniques

The next step involves determining the impact of different materials and techniques on the system in light of the factors identified in the previous steps. For example, the use of horizontal directional drilling (HDD) techniques lends itself to the installation of smaller pipes, and a worker skilled in the art would know the limitations of HDD and its appropriateness for application to the present system. The sensitivity to adequate venting and sewer grade in relation to the limitations of installation accuracy should be considered when using HDD as well as the boundaries in which the potential to create an air lock in the sewer exists. As a result of these factors, a determination can be made as to whether HDD may or may not be appropriate for use within the confines of said boundary.

Step 7—Features Unique to Present System

The next step involves examining the above factors in light of the features unique to the present system, for example and without limitation, higher flow rates, flexible piping, smaller diameter pipes, minimal solid effluent running through the system, flow attenuation, peak shifting, scouring velocity, infiltration rates, minimum grades and the like. For example, since a leach field is not a component of the sewer collection system, this area is not needed for the field and residences can be located closer to one another. Given the system's airtight nature, the respective positioning of the one or more wells in a community is not restricted by the sewer system. In addition, the size of a lot is not restricted by the existence of leach fields, which permits lot developers more leeway in lot design and sizing.

Step 8—Designing the Layout of the System

The next step involves designing the layout of the sewer system in light of the factors identified in the previous steps so as to take advantage of topographical features, the features of the present system, minimize disruption to residents, and to optimize the flow capacities of the liquid through the system.

Installing the System

In one embodiment, once an overall and detailed infrastructure design is presented and approved, there are three major steps to be undertaken when installing the sewage collection system of the present invention.

Figure 2:
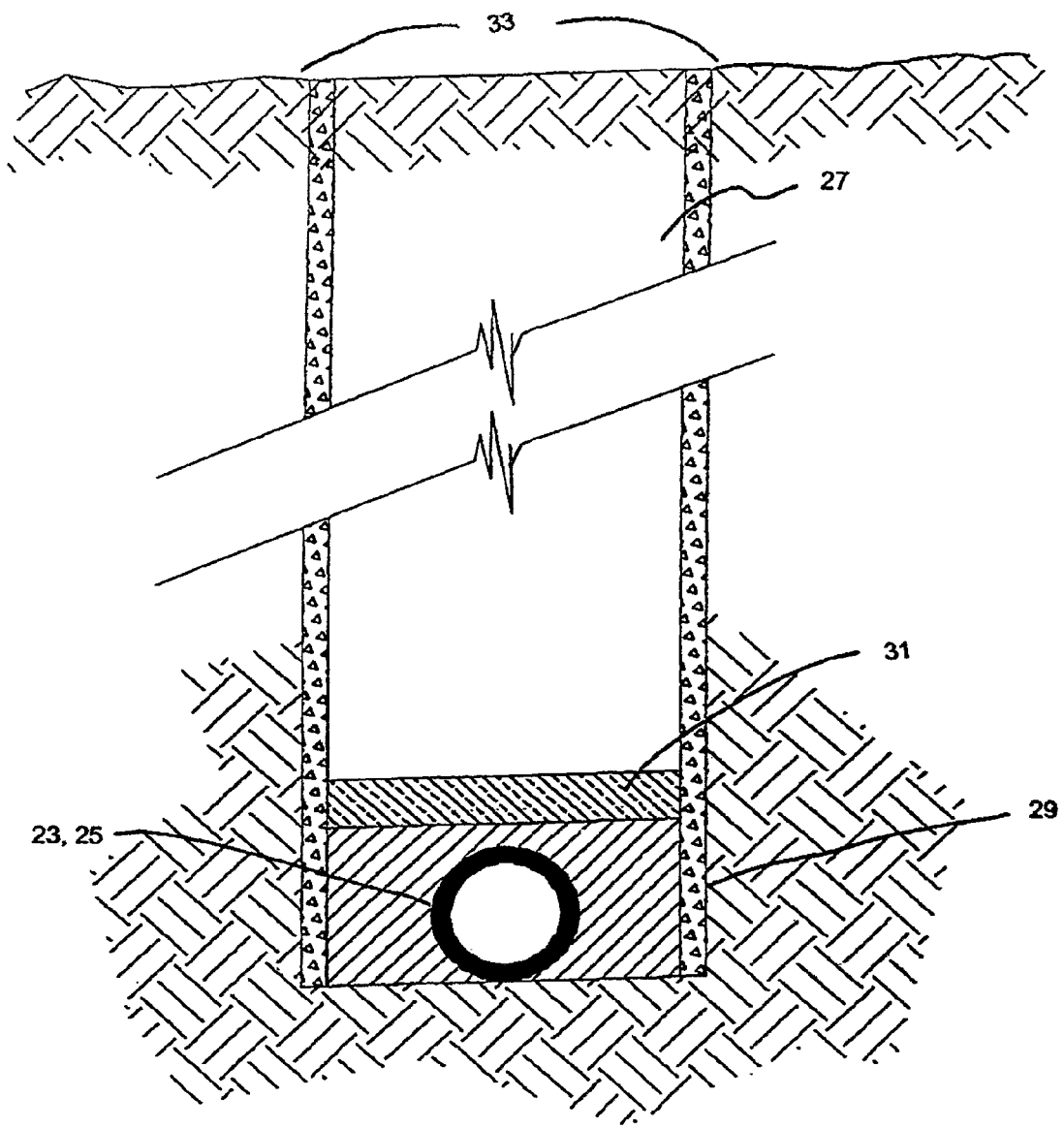
FIG. 2 is an end cross sectional view of the sewer pipe from FIG. 1.

The first step is the installation of the collection main, typically alongside or underneath the community roads or boulevards. With reference to FIG. 2, because of the smaller size and flexibility of the lateral sewer pipe 23 and/or collection main 25, pipes can be placed in an open trench 27 which does not need to be as wide or deep as in historic sewer systems. The trenches can be dug with a backhoe, trencher, horizontal drilling equipment, or other excavation equipment. In areas that are predominantly composed of rock, trenches can be made by blasting and removal of the raw material. The trenches may also be dug using manual labour where such labour is relatively inexpensive, such as in developing countries. Typically, the trench 27 is narrow and shallow, approximately one foot wide and three feet deep in climates where the frost depth is shallow. In one embodiment and where necessary due to climatic or environmental conditions for example, the lateral sewer pipe 23 or collection main 25 can be surrounded by a sand bedding 29 and covered with insulation material 31 such as Styrofoam insulation. The trench 27 can then be backfilled as in historic systems to restore the ground property 33 to its original condition.

With reference to FIG. 11, in one embodiment of the present invention, and where necessary due to climatic or environmental conditions, one or more heat traces 38 comprising a copper wire operatively connected to one or more heat sources (not shown) is located within the pipe 23. Heat is conducted through the copper wire and prevents liquid in the pipe from freezing.

In areas of re-servicing municipal services where septic tank and leach fields are failing, the installation will optimize the existing residential plumbing outlets to minimize expense and disruption to the community. In such cases, the existing plumbing outlets are typically directed towards the rear of the residence. The system will be able to accommodate flexibility in service hook-ups, while maintaining adequate flow, venting and access as discussed above. Typically, historic sewers require household plumbing to be re-routed to the front of the residence. The flexible, small diameter piping used in the present system allows the system to be installed through residential backyards with minimal disruption. The system could be installed to optimize the flexibility of HDPE, with lateral installation in the form of sweeping, non-jointed arcs to convenient connection points along roadways. The system could be installed to minimize complications or interference from other services such as natural gas pipelines or potable water services, using the advantage of pipe flexibility, suitability for layout away from other services and lower excavation requirements. In addition, exhibits flexibility in terms of its ability to be combined with other existing infrastructure such as historic sewers, septic tank effluent pumping systems, and previously installed small bore sewers. Connections to existing sewers can be effected at manholes, pump stations or other points of convenience within the existing infrastructure. Connections are made in a manner similar to that of historic sewers and would be known to a worker skilled in the art. The design layout can minimize disruption to the local community, including prevention of road closures, noise, dust, traffic re-routing, haulage traffic and so on. For communities that have septic systems, when it is time to connect the system of the present invention to the dwelling, the individual septic stations are decommissioned by pumping them out and, if they are not removed, typically the floor is pierced and they are filled with sand or other media. The associated septic field is then abandoned.

The next step is connecting the collection main to a treatment plant. Connections are made in a manner similar to that of historic sewers and would be known to a worker skilled in the art.

The final step is to install the primary treatment units in their selected locations and the lateral HDPE pipes connecting each primary treatment unit to the collection main.

The location of the primary treatment units will depend on the individual site conditions. The appropriate location will ensure adequate access for delivery trucks and be free of obstructions. The unit is placed in an excavated hole, which has a bedding of clean stone, which acts as a uniform bearing surface. The bedding must be level and free of stones that would cause pressure points under the bottom of the installed unit. Some sites may require specially designed bearing surfaces. As the unit is placed on the bedding, insulation may be added. The unit is sealed and connected and the inlet and outlet pipes are connected. Seals must be clean and meet compression and other installation requirements as prescribed by the seal manufacturer. Unit sections sealed on site are not backfilled until the sealant has settled. The remaining hole is backfilled and compacted.

Pressure Testing the System

In one embodiment of the present invention, once a primary treatment unit is connected to the source of sewage such as a residential building and the rest of the system, all vents, clean-outs and access hatches are sealed so that the system can be pressure tested. In one embodiment, one or more divisions comprising multiple residences can be pressure tested, independently from the rest of the system. In one embodiment, the entire system can be pressure tested. Pressure testing of a part or the entire system is conducted in a manner known to the skilled worker and for a sufficient duration and at a sufficient pressure (350+ kPa) to ensure that the system is not only watertight, but also substantially airtight. All wyes, tees, and end of side sewer stubs can be plugged with flexible joint caps, or acceptable alternates, securely fastened to withstand the internal test pressures. Testing occurs from cleanout to manhole cleanout including laterals to the primary treatment units. Equipment used in testing includes one or more of each of the following: compressors, shutoff valves, safety valves, pressure regulating valves, pressure reduction valves and pressure gauges. The test section is filled slowly with air until a constant pressure of 350 kPa (50 psi) is obtained. The pressure is maintained for 10 minutes with a pressure drop of less than 10% of the starting value. Closed circuit television inspections can be performed after the pressure test has passed.

After the system is successfully pressure tested, it can be put into use. During use, air vents are required to allow sewage flow and prevent undesired conditions of air or hydraulic lock. As discussed above, the layout of the system calculates the quantity and location of required venting based on the topography, load and other factors.

Optimizing Decomposition of Solid Waste

As discussed above, the present invention features a larger volume first compartment than in historic septic tanks. One advantage of the larger first compartment is that it can contain a larger volume of sewage, which assists in extending the cleanout cycle. A further advantage of a larger first compartment is that it can act as a surge suppressor to slow the flow of sewage through the system. Faster flow rates result in less settling, higher TSS levels and more solid sewage being conducted out of the primary treatment unit. Historic systems can compensate for surges with redundant surge suppression tanks located throughout the system. The present invention avoids the need for such tanks, thus reducing the cost and complexity of the sewer system.

A further advantage of a greater ratio between the first and second compartment is that it allows for a longer hydraulic retention time, allowing for more settling to occur before the sewage is conducted to the second compartment. The level of pollution in water is generally calculated as a factor of biological oxygen demand (BOD) which measures the amount of oxygen extraction caused by the biodegradation of materials in the water; and TSS, which measures total suspended solids or the particulate content of the water. Historic septic systems product effluent with a BOD of 250 mg/L and a TSS of 200 mg/L. The greater ratio between the first and second compartments in the primary treatment unit of the present invention reduces the BOD and TSS levels in the sewage passing out of the primary treatment unit and into the sewer system. Typical BOD levels for effluent leaving the primary treatment unit of the present invention are 140 mg/L and typical TSS levels are 30-35 mg/L. These lower levels of pollutants moving through the system can reduce the burden on sewage processing plants.

Over time, there are substantially three distinguishable sewage layers which develop in the first compartment of the primary treatment unit: 1) the scum layer, which is substantially liquid and sludge. The scum is composed of materials with a lower specific gravity than water such as grease, oil, and fats: 2) the middle layer comprises liquid and suspended solids, wherein these solids are typically very small organic materials and continue to be degraded while in the liquid layer; 3) the bottom sludge layer contains materials that have a higher specific gravity than water, are denser than water and are derived from much of the solid portion of sewage waste.

In one embodiment of the present invention, solid sewage settling to the bottom of the first compartment of the primary treatment unit is reduced by the action of microbial digestion. The solid sewage accumulates for a period of time and may then be pumped out of the primary treatment unit and removed on a regular basis. Typically, for a primary treatment unit used in a residential application, the first compartment can handle up to 17 years of accumulated sludge, although a 7-10 year cleanout maintenance cycle can enable the system to operate within a desired efficiency level.

In one embodiment of the present invention, the first compartment is operationally connected to a siphon such that solid waste can be extracted from the primary treatment unit during routine cleanout.

Decomposition of solid waste inside the primary treatment unit occurs as naturally occurring microorganisms break down and digest the waste. Optimization of decomposition is desirable as it reduces or reverses the rate of accumulation of solids within the primary treatment unit which extends clean-out cycles.

Microbial digestion of wastewater solids is promoted by optimizing environmental conditions, such as temperature, pH, components, nutrient levels, moisture or water-content and aeration levels.

In one embodiment of the present invention, the primary treatment unit comprises a means for optimizing one or more environmental conditions to promote microbial digestion. Optionally, the primary treatment unit can further comprise a means for monitoring environmental conditions within the waste solid including one or more sensors, for example without limitation, temperature sensors, pH sensors, moisture sensors, aeration sensors and the like.

In one embodiment of the present invention, the primary treatment unit comprises a feedback system responsive to environmental cues as a means for optimizing one or more environmental conditions in response to signals received from one or more sensors.

Means for Optimizing Temperature

In one embodiment of the present invention, the rate of microbial digestion of solid waste in the primary treatment unit 3 is optimized through the addition of heat. Maintaining the temperature of the sludge within an optimal range can increase the rate of digestion of waste solids. Increasing the temperature inside the primary treatment unit optimizes the growth rate of the microorganisms that break down the sludge. A worker skilled in the art would be aware of the optimal temperature range required for efficient microbial reactions and thus waste solid breakdown.

In one embodiment of the present invention, there is provided a primary treatment unit that is insulated to increase and/or maintain a constant desired optimum temperature with reference to the ambient temperature outside of the primary treatment unit which may or may not be optimal.

Figure 14:
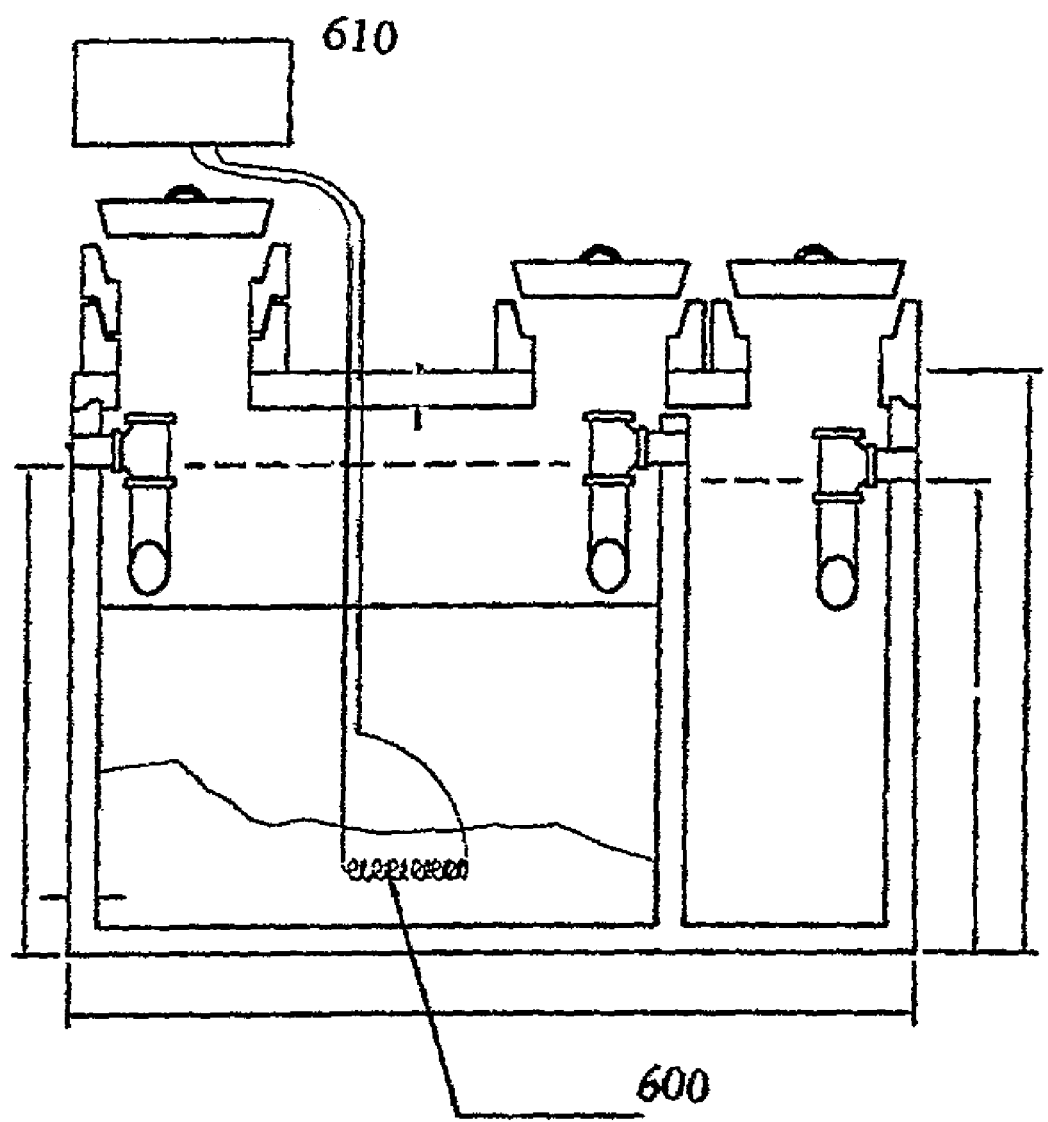
FIG. 14 is a side cross sectional view of a primary treatment unit with a heating means according to an embodiment of the present invention

With reference to FIG. 14, in one embodiment of the present invention, the temperature in the primary treatment unit 3 is increased through a heating means 600. The heating means can be powered by a power source 610 such as a solar panel array, or other source as would be readily understood by a worker skilled in the art. The heating means can either be located within the primary treatment unit or external to the primary treatment unit.

In embodiments in which heating means are external to the primary treatment unit, the heating means include means for heating the walls of the primary treatment unit such as slab heaters. Alternatively, waste containing a solid component can be pre-heated prior entering a primary treatment unit.

In one embodiment, the heating means also comprises a temperature sensing means such as a thermostat.

In one embodiment, the heating means also comprises a feedback system which receives information from a temperature sensor, such as a thermostat, and controls the heating means so as to maintain a preset optimal temperature.

Aeration

Increasing oxygen available to microbes promotes aerobic digestion of the waste solids within the primary treatment unit. Effective aeration of the waste solid can be accomplished by either pre-settling aeration of the waste or by post-settling aeration of the waste.

Aeration can be provided either through the introduction of air or high-purity oxygen and may be intermittent or continuous.

In one embodiment, the level of aeration will be within a range that maintains the biomass' energy requirements and supports efficient facultative bacterial reactions without contributing to the net production of new biomass.

Figure 15:
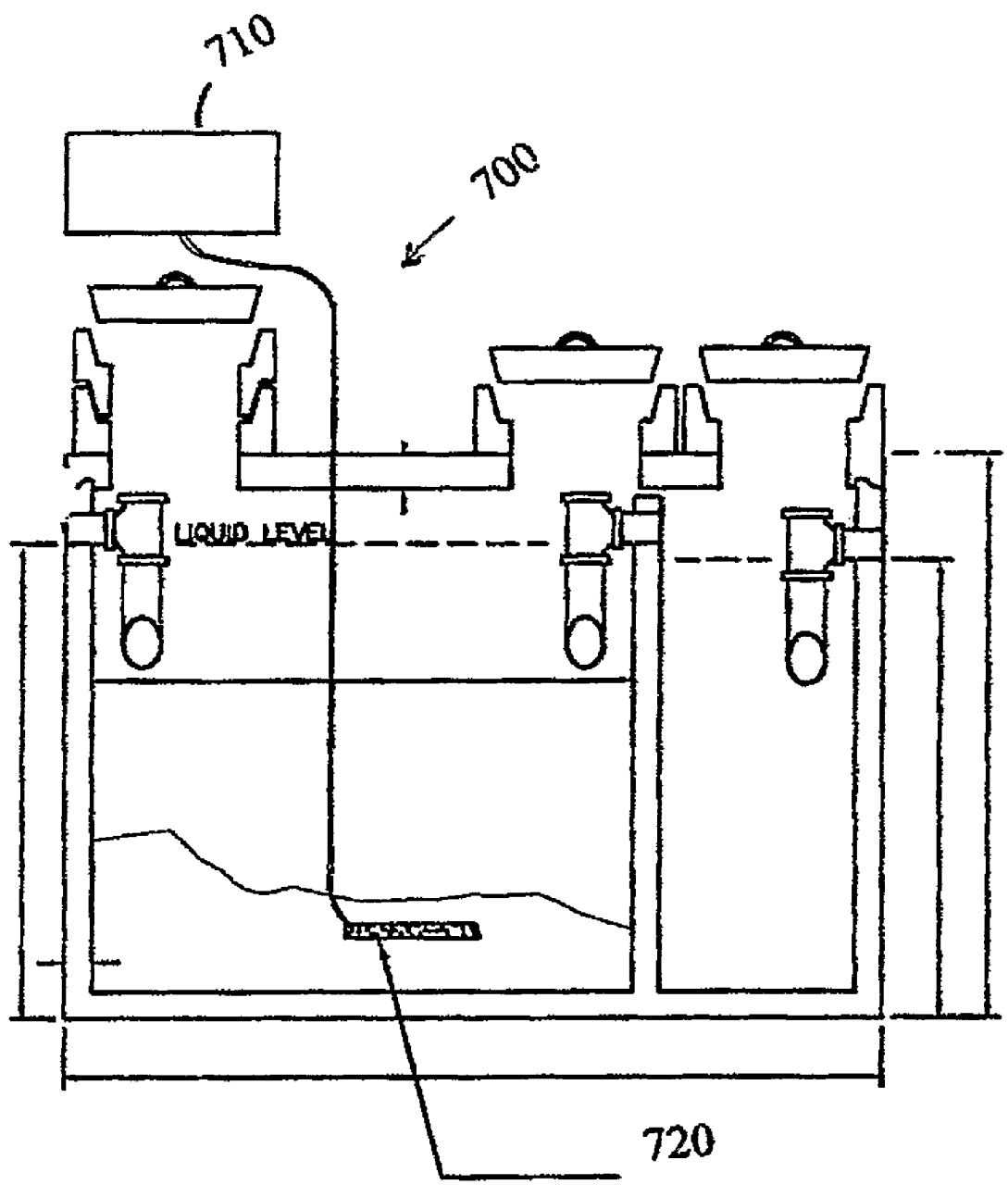
FIG. 15 is a side cross sectional view of a primary treatment unit with an aeration apparatus according to an embodiment of the present invention

With reference to FIG. 15, in one embodiment of the present invention, there is provided an aeration means 700 comprising a compressor 710 that pressurizes air and delivers it into the primary treatment unit; and a diffuser 720 that distributes the air inside the primary treatment unit to allow the sludge to be broken down through aerobic digestion. Means for diffusion are known in the art and include coarse bubble diffusers, fine bubble diffusers, jet aerators, static aerators, and mechanical mixers or mechanical surface aerators, or other aeration devices as would be readily understood by a worker skilled in the art. The compressor system can be powered by a power source (not shown) such as a solar panel array, or other power source as would be readily understood by a worker skilled in the art.

Means for Producing In Situ Oxygen and Hydrogen

The in situ production of oxygen and hydrogen stimulates both aerobic and anaerobic processing. The oxygen is used as an electron acceptor by the aerobic bacteria, while the hydrogen is consumed in anaerobic reactions and can stimulate the digestion process beyond the acidogenesis phase to.

Means for the in situ generation of oxygen and/or hydrogen are known in the art and can include any mechanism capable of electrolysis, including one or more electrolytic cartridges, cells or chambers.

In one embodiment of the invention, the mechanism capable of electrolysis is capable of water electrolysis. In one embodiment of the present invention, the mechanism capable of electrolysis is capable of generating oxidizing agents.

The type of water electrolysis apparatus that are appropriate for use in the instant invention will vary according to the functional requirements for the system.

A worker skilled in the art will appreciate that the electrolysis apparatus can function intermittently or continuously. The electrolysis apparatus can be turned on or off either in a pre-programmed manner or in response to signals, e.g. from sensors.

In one embodiment, the electrolysis apparatus comprises two or more electrodes and an energy or power source.

In one embodiment, the electrolysis apparatus comprises a process controller operatively connected to one or more electrolysis apparatus and one or more sensors. The process controller can comprise a device capable of receiving and interpreting signals from the one or more sensors, processing the received signals and sending commands to one or more electrolysis apparatus to optimize results with substantially minimum energy costs. The process controller can also perform supervisory functions, such as monitoring for system failures, etc.

In one embodiment, the process controller further comprises a sensing means for detecting pH levels and, in order to prevent acidification of the sludge due to H+ build up, enabling the electrolysis of water to be regulated in a pH-dependent manner.

Electrolysis Apparatus

Figure 16:
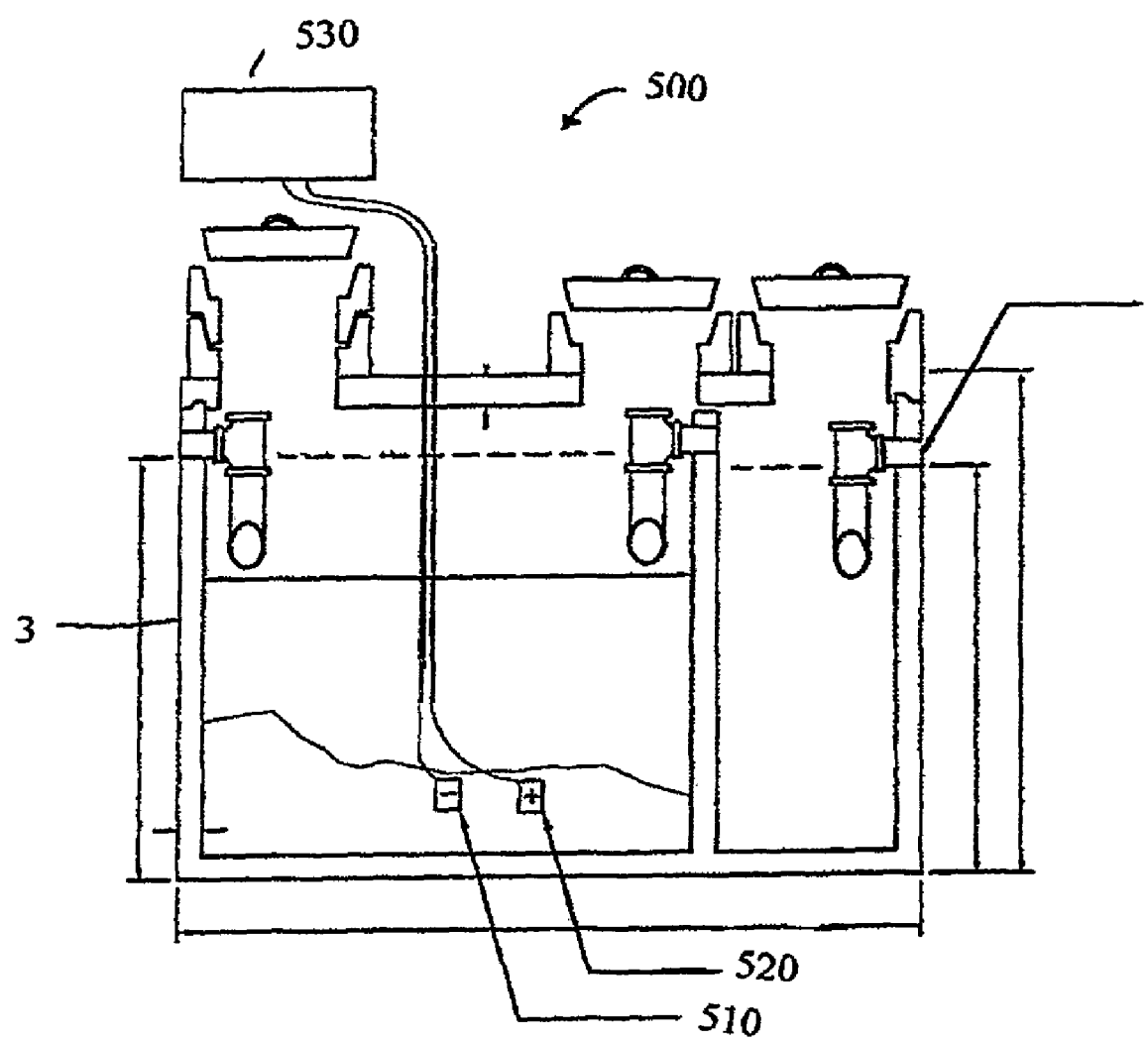
FIG. 16 is a side cross sectional view of a primary treatment unit with an electrolysis apparatus according to an embodiment of the present invention

With reference to FIG. 16, in one embodiment of the present invention, the electrolysis apparatus 500 comprises two or more electrodes 510 and 520 located on the inner surface of the primary treatment unit 3. The two or more electrodes 510 and 520 are operatively connected to a power source 530, located externally to the primary treatment station 3. During water electrolysis, the cathode 510 or negative electrode generates hydrogen and the anode 520 or positive electrode generates oxygen. Alternatively, the electrolysis unit may generate other (non-oxygen) oxidizing agents.

There are various types of electrodes known in the art, including flat screen, mesh, rod, hollow cylinder, plate, or multiple plates, among others. A worker skilled in the art would know which type of electrode is appropriate for use in the instant invention according to the functional requirements of the system.

Solid particles adhere to bubbles that rise to the surface and out of the treatment zone. In addition, when oxygen bubbles form, inefficiencies in the system are created as oxygen fails to properly diffuse. In one embodiment of the invention, the configuration of the anode will be selected to reduce or prevent the formation of gas bubbles.

The electrode may be composed of a variety of materials. The electrode material must be sufficiently robust to withstand the elevated voltage and current levels applied during the electrolytic process of the invention, without excessive degradation of the electrode. A given electrode may be metallic or nonmetallic. Where the electrode is metallic, the electrode may include platinized titanium, among other compositions, as would be readily understood by a worker skilled in the art. Where the electrode is nonmetallic, the electrode may include graphitic carbon, or can be one or more of a variety of conductive ceramic materials, as would be readily understood by a skilled worker.

The anode and cathode of the electrode cell may have any of a variety of different compositions and/or configurations without departing from the scope of the present invention.

In one embodiment of the present invention, the anode and cathode may be substantially equivalent in order to facilitate bipolar operation to reduce scale build-up on the electrodes. Electrolytic processes may generate thin films or deposits on the electrode surfaces that can lower the efficiency of the water treatment process. Descaling of the electrodes to remove some films may be carried out by periodically reversing the polarity of operation (switching the anode and cathode plates to the opposite polarity). Automatic logic controls may permit programmed or continuous descaling, which may reduce labor and maintenance costs.

In one embodiment of the present invention, a reference electrode is integrated into the electrolysis apparatus. A reference electrode is an electrode that has a well-known and stable equilibrium electrode potential that is used as a reference point against which the potential of other electrodes may be measured. While a variety of electrode configuration can fulfill the above requirements, a suitable reference electrode for the purposes of the invention would be readily understood by a worker skilled in the art and can include silver/silver-chloride electrode, calomel electrode, and a normal hydrogen electrode, among others.

In one embodiment of the present invention, at least one of the one or more electrodes is substantially submerged in the solid waste or sludge. In one embodiment, all of the electrodes are substantially submerged in the solid waster or sludge.

In one embodiment of the present invention, at least one of the one or more electrodes is partially submerged in the solid waste or sludge. In one embodiment, all of the electrodes are partially submerged in the solid waster or sludge.

Placement of the electrodes will vary according to the functional requirements of the system. The electrodes may be in a fixed position or movably mounted. The electrodes may be mounted on the walls and/or floor of the primary treatment unit.

In one embodiment of the present invention, the electrodes may be suspended within the sludge using various means known in the art.

Appropriate energy sources for the electrolysis apparatus are known in the art and the skilled technician will know which energy source is most appropriate for configuration of the system. The energy source will deliver a controlled electrical charge having a value determined by the requirements of the system. The energy or power source may be a standard or rechargeable battery, direct AC connection or solar power, amongst others known in the art.

Process

The process of micro-aeration generally relates to the optimization of environmental conditions within the solid waste such that microbial processing is facilitated.

In one embodiment of the process, the solid waste is heated or aerated.

In one embodiment of the process, the pH of the solid waste or the components of the solid waste is adjusted to alter microbial processing. Alternatively, the microbial population is adjusted either by changing conditions or by seeding solid waste with specific microbes. In one embodiment, the solid waste can be sterilized prior to seeding, for example by heat or ozone treatment.

In one embodiment, oxygen and hydrogen are generated in situ intermittently or continuously by water electrolysis. In one embodiment, other oxidizing agents are generated in-situ.

Integration with Other Solid Waste Reduction Systems and Methods

The system and processes described above for substantially optimizing solid waste decomposition can be integrated with other systems and processes for minimizing solid waste including, for example, pre- or post-enzymatic treatment, and others.

In one embodiment, the system and processes of the instant invention are integrated with systems for pre-treating sewage using electrolysis, for example as disclosed in U.S. Pat. Nos. 4,089,761 and 4,124,481, herein incorporated by reference.

In addition, one or more of the systems for promoting microbial processing of the instant invention can be combined.

EXAMPLES

The impact of electrolysis of wastewaters and solid waste or sludge accumulation can be assessed using a bench scale study with the electrolysis anode and cathode probes being placed in the sludge layer. This will allow for the substantial optimization of both the process and the system.

To determine optimal electrolysis conditions, either primary treatment unit sludge or septic tank sludge can be used and batch tests can be carried out to evaluate the electrochemical and microbiological mechanisms of sludge degradation allowing for optimization. As well, the overall efficiency of electrolysis can be evaluated in continuous or intermittent flow experiments. For comparisons, a blank (non-electrode) apparatus can also be tested.

Example 1

Determining Appropriate Applied Current

Existing literature suggests that there is an optimum range of applied current that stimulates the removal of Chemical Oxygen Demand (COD) in domestic wastewater. Septage sludges are typically much higher strength, with COD values in excess of 20,000 mg/L—though this is offset by extended holding times over longer time periods. The existing literature supports the notion of a current of 100-500 mAmps, with the largest benefit around 300 mA. This example describes batch experiments designed to find the most appropriate current in the absence of hydraulic influence. A number of 5 to 7 day tests can be conducted at different currents to find the optimum result for higher strength, high residence time sludges.

Protocol

Batch tests can be carried out in 1 L bottles. Batch testing eliminates the effects of hydraulics while testing for the optimum range of applied current. At startup, the bottles can be filled out with sludge (e.g. anaerobic or primary treatment unit sludge) and wastewater. The tests can be carried out over a period of approximately 5-7 days. The following parameters can be measured at the end of the test: gas analysis, soluble COD, Suspended Solids or Total Suspended Solids (SS/VSS), ammonium/nitrate concentration and phosphate concentration. In addition, to measurements taken at the end of the test, measurements can optionally be taken at the beginning of the test and at intervals during the test period.

A number of conditions can be evaluated simultaneously.

In one embodiment, three representative tests conditions may include the following:

Test #1, with the electrodes placed in the sludge zone

Test #2, with the electrodes placed in the liquid zone

Test #3, no electrodes (control).

To ensure the accuracy of the control test, the wastewater can be autoclaved and bottle #3 (control) can be maintained under sterile conditions. Furthermore, bottles #1 and #2 can be inoculated with a mixture of sludge and autoclaved sludge (1:1) so that the effect of heating on sludge degradation can be evaluated.

In one embodiment, a fourth and fifth test can be conducted in which Test #1 and Test #2 are repeated using unautoclaved sludge.

By assessing various applied currents, a range of optimized applied current can be determined.

Following the determination of a range of optimized applied current, the combined effect of electrolysis with heat can be assessed by repeating the above tests at various temperatures.

Example 2

Micro-aeration Related to Biological Yield (Upflow Anaerobic Testing)

Over-stimulation will contribute to new biomass; accordingly, it may be desirable to limit aeration to the biomass to a level that solely maintains energy requirements and support facultative bacteria efficient reactions. One key determinant is to generate either soluble COD or carbon dioxide ($CO_2$) from solid mass. As efficient organisms will be able to convert COD into stored energy (biomass), even under ideal current scenarios for COD removal, COD removal and sludge production may occur simultaneously. In order to effectively limit sludge accumulation, COD removal must be more efficient than sludge production.

The following experimental protocol will enable refining of the applied current in the context of a hydraulic reactor, with an emphasis on increasing COD removal efficiency, targeting hydrolysis reactions and lowering net biomass production.

Protocol

To evaluate the electrolysis function under continuous operation, with a further differentiation between the gas, liquid and solids phase upflow anaerobic testing can be completed.

In one embodiment, these tests can be carried out in three lab-scale septic tanks (~5 L each). The tanks can be inoculated with anaerobic or primary treatment unit sludge and operated for a period of 3 months. Two tanks can be equipped with electrodes, tank #1 at the bottom (sludge zone) and tank #2 in the middle (liquid zone). Tank #3 can serve as a control. The following parameters can be monitored: gaseous products, soluble COD, ammonium/nitrate, phosphate, SS/VSS.

Additional test conditions can be assessed using the upflow anaerobic testing system. For example, the combined effect of heat and electrolysis can be assessed be maintaining the lab-scale septic tanks at various temperatures.

Example 3

Bench-Scale Septic Tank Testing

To optimize the electrolysis reactor and to test use of alternative, less costly electrode materials additional vessels can be constructed and tested. During this phase, a more comprehensive analysis of wastewater constituents and reactions can be conducted. Process flow can be closely akin to operations of an actual septic tank.

The experiments can be carried out using synthetic wastewater containing:

peptone—350 mg/L, beef extract—140 mg/L, $(NH_4)_2CO_3$—50 mg/L, urea—40 mg/L, NaCl—35 mg/L, $CaCl_2\ 2H_2O$—20 mg/L, $K_2HPO_4$—20 mg/L, $MgSO_4\ 2H_2O$—10 mg/L, and cellulose—250 mg/L Concentrations of Chemical Oxygen Demand (COD), volatile suspended solids (VSS) and Suspended Solids (SS) will be measured according to Standard Methods and off gas composition will be measured by gas chromatography.

A rectangular 5 L container can be used to simulate a primary treatment unit.

Nitrate, ammonium, and phosphate concentrations can be measured by HPLC.

Figure 13:
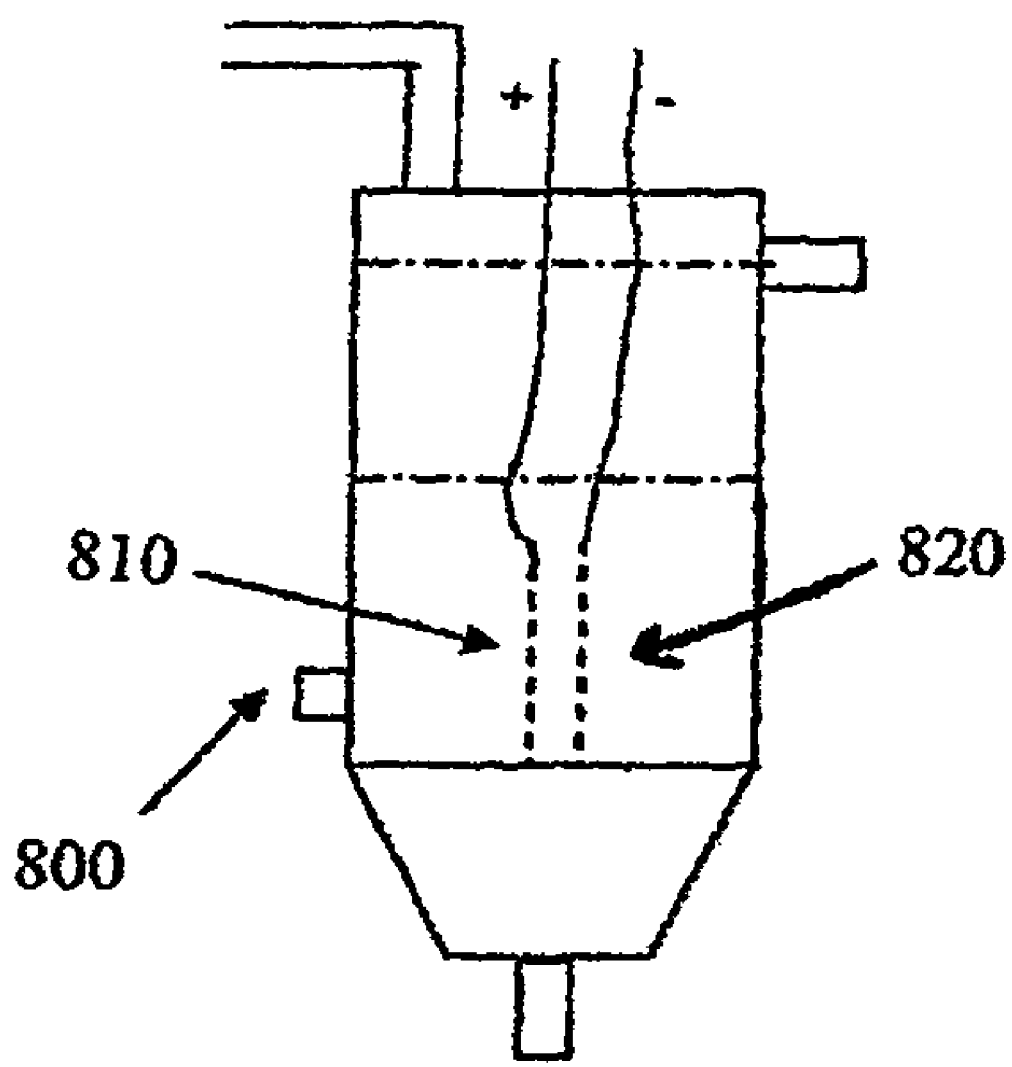
FIG. 13 is a side view of an electrode assembly according to one embodiment of the present invention.

With reference to FIG. 13, the electrode assembly 800 can comprise a cathode 810 and anode 820 separated by plastic spacers to a distance of approximately 5 mm. The cathode 810 can be a stainless steel cathode and the anode 820 can comprise a mixed metal oxide coated titanium mesh.

Assessing the Effect of Electrolysis on Other Parameters

Wastewater primary constituents of concern to WWTP operations are BOD, TSS, nitrogen and phosphorus. Accordingly, the effect of electrolysis on the above parameters can be assessed using the experimental protocols described above.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

We claim:

1. A sewer system for carrying sewage effluent from a source of sewage for treatment at a sewage treatment center, the sewer system comprising:
    an inlet pipe for carrying solid and liquid sewage from the source of sewage;
    a primary treatment unit for receiving said solid and liquid sewage from the source of sewage via the inlet pipe, wherein said inlet pipe is sealingly connected to the primary treatment unit, said primary treatment unit comprising a first compartment for receiving said solid and liquid sewage and a second compartment in fluid communication with said first compartment by means of a conduit for receiving substantially liquid sewage from said first compartment, wherein liquid and solid components of the sewage are substantially separated in said first compartment and the solid components of the sewage so separated are retained in said first compartment;
    a lateral sewer pipe for receiving substantially liquid sewage from said second compartment, said lateral sewer pipe sealingly connected to said second compartment, wherein flow of the substantially liquid sewage between the second compartment and the lateral sewer pipe is regulated by a flow attenuation device configured to provide a more consistent flow rate of liquid sewage to the lateral sewer pipe and to substantially eliminate instantaneous surge loads;
    a collection main sealingly connected to said lateral sewer pipe whereby said substantially liquid sewage is carried to said treatment center; and
    one or more vents sealingly connected to any of the primary treatment unit, lateral sewer pipe or collection main to permit the exchange of gasses between the sewer system and external environment during operation.

2. The sewer system of claim 1, wherein said system is substantially airtight when said vents are sealed.

3. The sewer system of claim 1, wherein said conduit comprises at least one tube; and
    wherein said tube is positioned at an angle relative to a central vertical axis of said primary treatment unit.

4. The sewer system of claim 1, wherein one or more of the inlet pipe, lateral sewer pipe and collection main is made of flexible pipe.

5. The sewer system of claim 1, wherein the flow attenuation device comprises an outlet assembly comprising:
    a substantially vertical pipe with an upper end and a lower end;
    an outlet pipe substantially perpendicular to and in fluid communication with said substantially vertical pipe, wherein said substantially vertical pipe comprises one or more partitions that divides said vertical pipe into two or more sections along its vertical axis from said lower end at least until a point where said substantially vertical pipe connects with said outlet pipe; and
    a plug with one or more orifices inserted into at least one of said two or more sections at the lower end of said substantially vertical pipe, wherein liquid passes through said one or more orifices prior to entering said outlet pipe.

6. The sewer system of claim 1, wherein the flow attenuation device comprises an outlet assembly comprising:
    a substantially vertical pipe with an upper end and a lower end;
    an outlet pipe comprising a first portion that is substantially perpendicular to and in fluid communication with said substantially vertical pipe and a second portion that is substantially parallel to said substantially vertical pipe, wherein said second portion is lower than said first portion;
    a weeping tube sealingly connected at one end said substantially vertical pipe and said second portion of said outlet pipe at the opposing end; and
    wherein the width of said weeping tube is less than the width of said substantially vertical pipe and less than the width of said outlet pipe.

7. The sewer system of claim 1, wherein the flow attenuation device comprises an outlet assembly comprising:
    a substantially vertical pipe with an upper end and a lower end; and
    a plug with one or more orifices inserted into the lower end of said substantially vertical pipe.

8. The sewer system of claim 1, wherein the flow attenuation device comprises an outlet assembly comprising a tee pipe; said tee pipe comprises one or more partitions that divide the tee pipe into two or more longitudinal sections and
    a plug with one or more orifices inserted into at least one of said two or more sections that limits the flow of liquid effluent entering the plugged section.

9. The sewer system of claim 1, wherein the flow attenuation device comprises an outlet assembly comprising a tee pipe and a restricted diameter weeping tube or siphon connected thereto.

10. The sewer system of claim 1, further comprising a means for promoting microbial processing, wherein the means for promoting microbial processing substantially optimizes environmental conditions for aerobic and/or anaerobic digestion of the solid components of the sewage.

11. The sewer system of claim 10, wherein the means for promoting microbial processing is a heating means, an aeration means or a means for producing in situ oxygen and hydrogen.

12. The sewer system of claim 1, wherein hydrogen produced by the means for producing in situ oxygen and hydrogen stimulates methanogenesis.

13. The sewer system of claim 1, further comprising an electrolysis system comprising a power source and an electrode pair comprising an anode and cathode, wherein the electrode pair is located within the first compartment, and wherein at least one member of the electrode pair is optionally located proximal to the floor of the primary treatment unit.

14. A primary treatment unit for connection to a source of sewage and a means for conducting sewage effluent to a sewage treatment center, said primary treatment unit comprising:
- a first compartment for receiving solid and liquid sewage from said source of sewage and retaining sewage solids;
- a second compartment in fluid communication by means of a conduit with said first compartment for receiving substantially liquid sewage from said first compartment and for delivering said substantially liquid sewage to said means for conducting sewage effluent; wherein flow of the substantially liquid sewage between the second compartment and the means for conducting liquid sewage is regulated by a flow attenuation device configured to provide a more consistent flow rate of liquid sewage to the means for conducting sewage effluent and to substantially eliminate instantaneous surge loads;
- said conduit comprising one or more tubes leading from said first compartment to said second compartment; and
- wherein said tubes are positioned at an angle relative to a central vertical axis of said primary treatment unit.

15. The primary treatment unit of claim 14, wherein the means for conducting sewage effluent is a lateral pipe.

16. A flow attenuation device for regulating flows of liquid exiting a primary treatment unit, said flow attenuation device comprising an outlet assembly comprising:
- one or more substantially vertical pipes each with an upper end and a lower end,
- one or more outlet pipes, at least one of which comprises a first portion that is substantially perpendicular to and in fluid communication with at least one of said one or more substantially vertical pipes and a second portion that is substantially parallel to said at least one of said one or more substantially vertical pipes; wherein said second portion is lower than said first portion;
- a weeping tube sealingly connected at one end to said at least one of said one or more substantially vertical pipes and said second portion of said at least one of said one or more outlet pipes at the opposing end;
- wherein the width of said weeping tube is less than the width of said at least one of said one or more substantially vertical pipes and the width of said at least one of said one or more outlet pipes, and wherein said outlet assembly is optionally incorporated into the primary treatment unit.

17. A method for pressure testing a sewer system for carrying sewage effluent from a source of sewage for treatment at a sewage treatment center, or a portion thereof, the sewer system comprising:
- an inlet pipe for carrying solid and liquid sewage from the source of sewage;
- a primary treatment unit for receiving said solid and liquid sewage from the source of sewage via the inlet pipe, wherein said inlet pipe is sealingly connected to the primary treatment unit, said primary treatment unit comprising a first compartment for receiving said solid and liquid sewage and a second compartment in fluid communication with said first compartment by means of a conduit for receiving substantially liquid sewage from said first compartment, wherein liquid and solid components of the sewage are substantially separated in said first compartment and the solid components of the sewage so separated are retained in said first compartment;
- a lateral sewer pipe for receiving substantially liquid sewage from said second compartment, said lateral sewer pipe sealingly connected to said second compartment, wherein flow of the substantial) liquid sewage between the second compartment and the lateral sewer pipe is regulated by a flow attenuation device configured to provide a more consistent flow rate of liquid sewage to the lateral sewer pipe and to substantially eliminate instantaneous surge loads;
- a collection main sealingly connected to said lateral sewer pipe whereby said substantially liquid sewage is carried to said treatment center; and
- one or more vents sealingly connected to any of the primary treatment unit, lateral sewer pipe or collection main to permit the exchange of gasses between the sewer system and external environment during operation,
- wherein said system is substantially airtight when said vents are sealed
- said method comprising the step of sealing one or more of said one or more vents; filling said sewer system or portion thereof with air to a specified pressure and monitoring pressure in said sewer system or portion thereof for a specified time.

* * * * *